United States Patent
Amano

(10) Patent No.: US 8,151,346 B2
(45) Date of Patent: Apr. 3, 2012

(54) UNAUTHORIZED USAGE PREVENTION SYSTEM AND INFORMATION PROCESSING APPARATUS

(75) Inventor: Masato Amano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1240 days.

(21) Appl. No.: 11/898,129

(22) Filed: Sep. 10, 2007

(65) Prior Publication Data

US 2008/0072318 A1 Mar. 20, 2008

(30) Foreign Application Priority Data

Sep. 11, 2006 (JP) ................................. 2006-246042

(51) Int. Cl.
*G06F 7/04* (2006.01)
(52) U.S. Cl. .......... 726/21; 380/251; 380/270; 713/165; 713/187; 713/188; 726/9; 726/20; 726/22; 726/26; 726/4; 726/17
(58) Field of Classification Search .................. 380/251, 380/277; 713/187, 188, 165; 726/9, 20, 726/22, 26, 21, 4, 17
See application file for complete search history.

(56) References Cited

U.S. PATENT DOCUMENTS

| | | | | |
|---|---|---|---|---|
| 5,388,211 | A | * | 2/1995 | Hornbuckle ................... 717/178 |
| 5,497,479 | A | * | 3/1996 | Hornbuckle ..................... 463/29 |
| 5,613,089 | A | * | 3/1997 | Hornbuckle ................... 711/164 |
| 5,649,187 | A | * | 7/1997 | Hornbuckle ........................ 1/1 |
| 5,991,399 | A | * | 11/1999 | Graunke et al. ............. 380/279 |
| 7,003,116 | B2 | * | 2/2006 | Riedel et al. .................. 380/277 |
| 7,558,804 | B1 | * | 7/2009 | Polydov ............................... 1/1 |
| 7,673,340 | B1 | * | 3/2010 | Cohen et al. .................... 726/22 |
| 2003/0086570 | A1 | * | 5/2003 | Riedel et al. .................. 380/277 |
| 2005/0086340 | A1 | * | 4/2005 | Kang et al. ..................... 709/224 |
| 2006/0177065 | A1 | * | 8/2006 | Halbert ......................... 380/277 |
| 2007/0150937 | A1 | * | 6/2007 | Gatto et al. ....................... 726/1 |

FOREIGN PATENT DOCUMENTS

| | | |
|---|---|---|
| JP | 63-132336 | 6/1988 |
| JP | 2002-091594 | 3/2002 |
| JP | 2002-312052 | 10/2002 |
| JP | 2005-025616 | 1/2005 |
| JP | 2005-031761 | 2/2005 |
| JP | 2005-038068 | 2/2005 |
| JP | 2005-049952 | 2/2005 |
| JP | 2005038068 | * 5/2005 |

* cited by examiner

*Primary Examiner* — April Shan
(74) *Attorney, Agent, or Firm* — Harness, Dickey & Pierce, P.L.C.

(57) ABSTRACT

A disclosed unauthorized usage prevention system enables execution of at least one software item including an identification information item uniquely associated with the software item, based on a key information item in a key module. An information processing apparatus includes a key information storage unit, a control unit, an unauthorized usage prevention controller, and a port. The unauthorized usage prevention controller includes a connection recognition unit and a key information copying unit. When the unauthorized usage prevention controller recognizes that the key module is connected to the port, the unauthorized usage prevention controller copies the key information item in the key module into the key information storage unit, and the control unit enables execution of all of the software items with identification information items associated with the key information items held in the key information storage unit.

7 Claims, 17 Drawing Sheets

FIG.3

KEY INFORMATION ITEM 32

| ADDRESS | SIZE(BYTE) | FIELD NAME | D7 | D6 | D5 | D4 | D3 | D2 | D1 | D0 |
|---|---|---|---|---|---|---|---|---|---|---|
| 00-03h | 4 | SIGNATURE | ONLY HARDWARE KEY WITH SPECIFIC CHARACTER STRING IS VALID ||||||||
| 04-07h | 4 | HARDWARE-KEY SERIAL NO. | SERIAL NUMBER OF HARDWARE KEY ||||||||
| 08-1Dh | 22 | RESERVED | SPARE SPACE ||||||||
| 1E-1Fh | 2 | CRC16 | CRC 16 VALUES FOR ADDRESSES FROM AND BEYOND 20h ||||||||
| 20-2Fh | 16 | APPLICATION GUIDE | IDENTIFICATION NUMBER OF SOFTWARE ITEM 28 ||||||||
| 30-3Fh | 16 | APPLICATION NAME | CHARACTER STRING INDICATING NAME OF SOFTWARE ITEM 28 ||||||||
| 40-4Fh | 16 | VENDER NAME | CHARACTER STRING INDICATING DEVELOPER OF SOFTWARE ITEM 28 ||||||||
| 50-53h | 4 | APPLICATION SERIAL NO. | SERIAL NUMBER OF EACH SOFTWARE ITEM 28 ||||||||
| 54h | 1 | APPLICATION MAJOR VERSION | MAJOR VERSION OF SOFTWARE ITEM 28 ||||||||
| 55h | 1 | APPLICATION MINOR VERSION | MINOR VERSION OF SOFTWARE ITEM 28 ||||||||
| 56-57h | 2 | RESERVED | SPARE SPACE ||||||||
| 58-5Fh | 8 | AUTHENTICATION ID | AUTHENTICATION INFORMATION (KEY INFORMATION) INDIVIDUALLY GIVEN TO SOFTWARE ITEM 28 ||||||||
| 60-7Fh | 32 | APPLICATION DATA | SPECIFICATION INFORMATION UNIQUE TO SOFTWARE ITEM 28 ||||||||

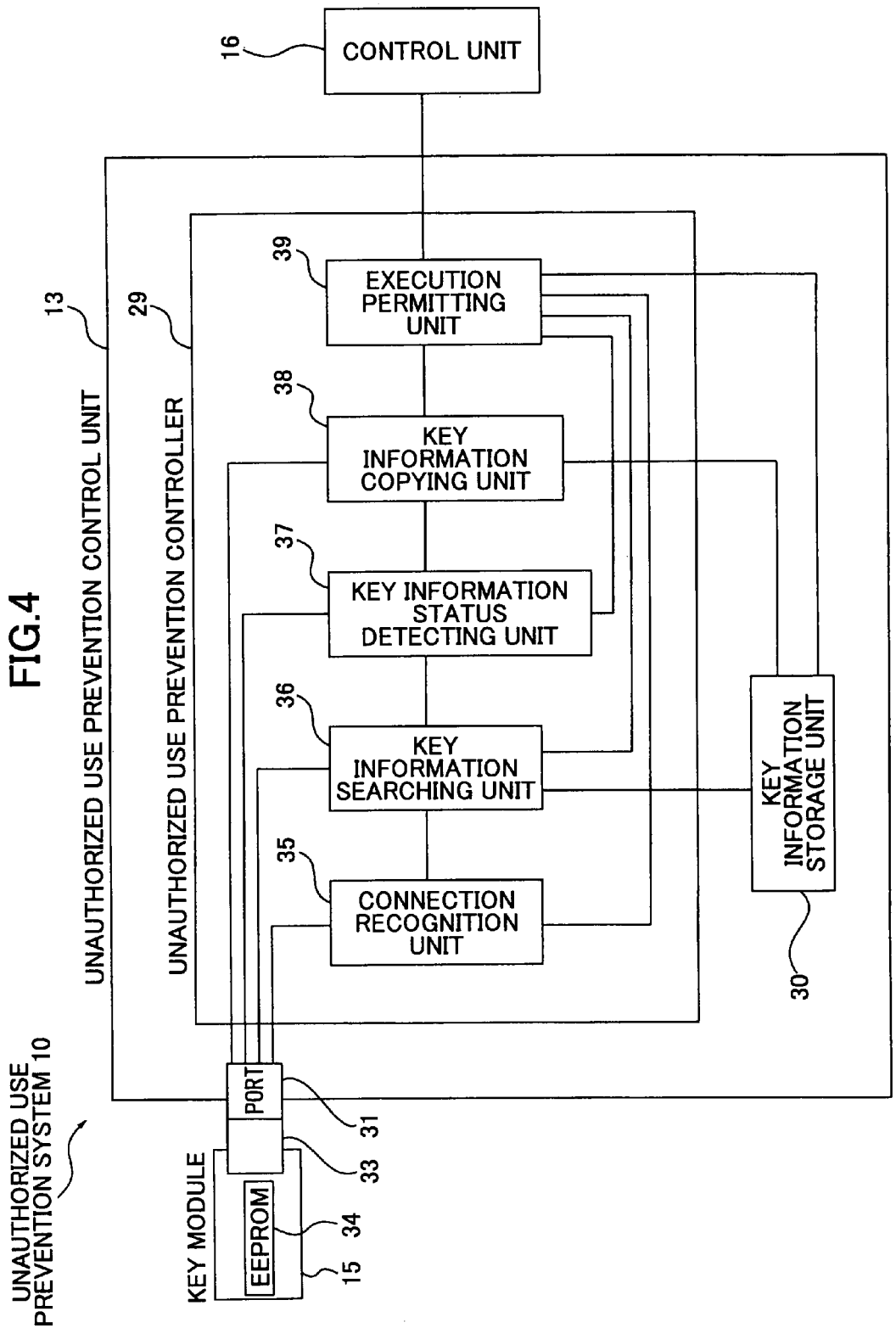

FIG.9

KEY INFORMATION ITEM 332

| ADDRESS | SIZE(BYTE) | FIELD NAME | D7 | D6 | D5 | D4 | D3 | D2 | D1 | D0 |
|---|---|---|---|---|---|---|---|---|---|---|
| 00-03h | 4 | SIGNATURE | ONLY HARDWARE KEY WITH SPECIFIC CHARACTER STRING IS VALID ||||||||
| 04-07h | 4 | HARDWARE-KET SERIAL NO. | SERIAL NUMBER OF HARDWARE KEY ||||||||
| 08h | 1 | DATA COPY STATUS | 00h: "UNUSED" FOR KEY INFORMATION REGISTRATION<br>01h: "USED" FOR KEY INFORMATION REGISTRATION ||||||||
| 09-1Dh | 22 | RESERVED | SPARE SPACE ||||||||
| 1E-1Fh | 2 | CRC16 | CRC 16 VALUES FOR ADDRESSES FROM AND BEYOND 20h ||||||||
| 20-2Fh | 16 | APPLICATION GUIDE | IDENTIFICATION NUMBER OF SOFTWARE ITEM 28 ||||||||
| 30-3Fh | 16 | APPLICATION NAME | CHARACTER STRING INDICATING NAME OF SOFTWARE ITEM 28 ||||||||
| 40-4Fh | 16 | VENDER NAME | CHARACTER STRING INDICATING DEVELOPER OF SOFTWARE ITEM 28 ||||||||
| 50-53h | 4 | APPLICATION SERIAL NO. | SERIAL NUMBER OF EACH SOFTWARE ITEM 28 ||||||||
| 54h | 1 | APPLICATION MAJOR VERSION | MAJOR VERSION OF SOFTWARE ITEM 28 ||||||||
| 55h | 1 | APPLICATION MINOR VERSION | MINOR VERSION OF SOFTWARE ITEM 28 ||||||||
| 56-57h | 2 | RESERVED | SPARE SPACE ||||||||
| 58-5Fh | 8 | AUTHENTICATION ID | AUTHENTICATION INFORMATION (KEY INFORMATION) INDIVIDUALLY GIVEN TO SOFTWARE ITEM 28 ||||||||
| 60-7Fh | 32 | APPLICATION DATA | SPECIFICATION INFORMATION UNIQUE TO SOFTWARE ITEM 28 ||||||||

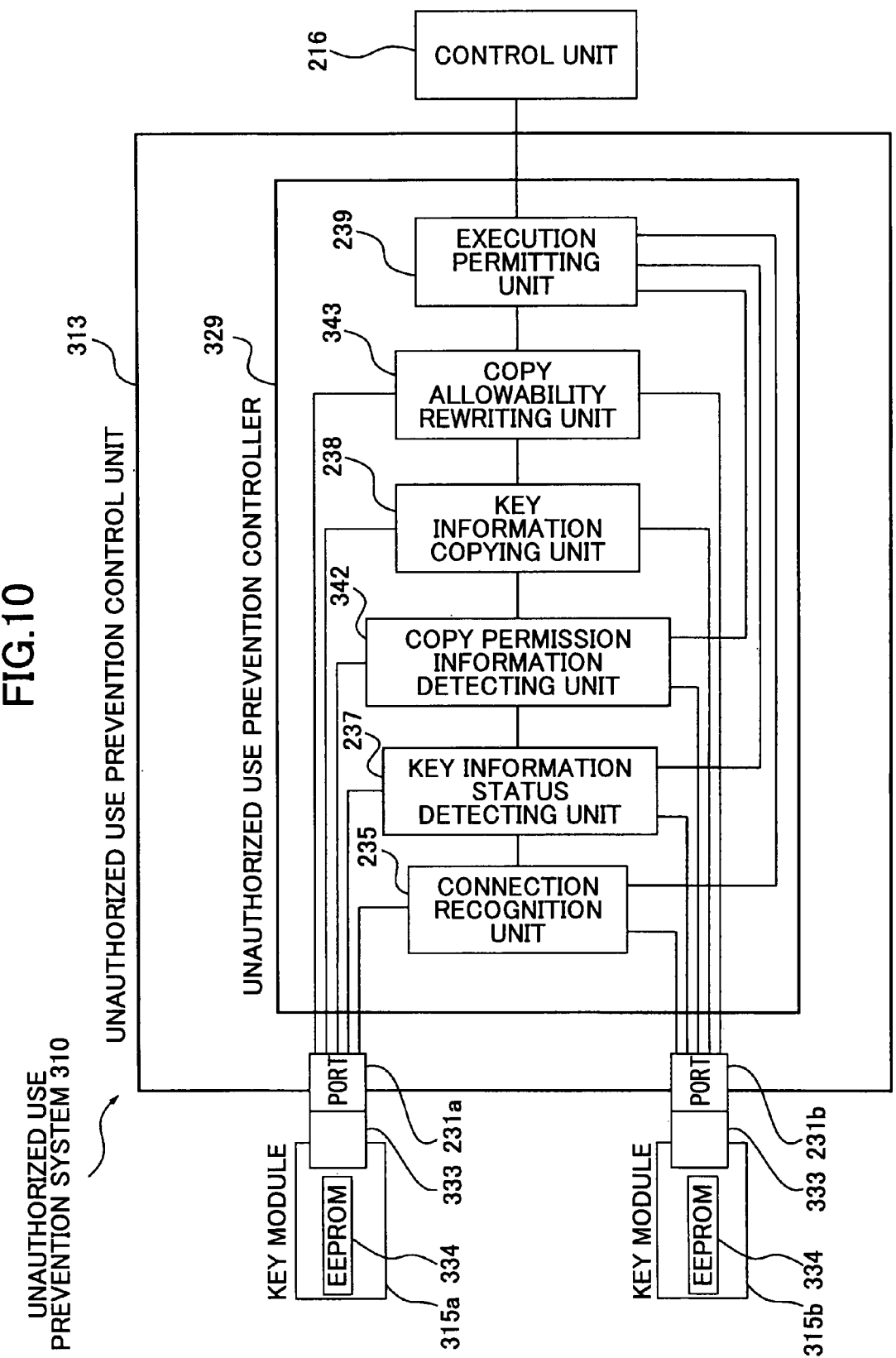

UNAUTHORIZED USAGE PREVENTION SYSTEM AND INFORMATION PROCESSING APPARATUS

BACKGROUND OF THE INVENTION

1. Field of the Invention

The present invention relates to an unauthorized usage prevention system for software executable in an information processing apparatus.

2. Description of the Related Art

Conventionally, software such as application programs can be installed in and executed by information processing apparatuses such as computers. There are cases where only one license is permitted per software product, and various measures are taken to prevent any unauthorized usage that violates this arrangement.

One unauthorized usage prevention measure employs the following method. That is, when a user attempts to install software or execute the installed software, the user is requested to input a character string for authentication, which character string is associated with the software. If the character string for authentication is not correctly input, the software will not be installed or executed. However, this method is ineffective in a case where the software is copied. A user will be able to install or execute the copy of the software as long as the user obtains the character string for authentication associated with the software. Accordingly, unauthorized usage cannot be completely prevented.

Furthermore, there are cases where restrictions are applied so that the software or the information processing apparatus in which the software is installed can only be operated during a limited test period, or restrictions are applied so that only limited functions of the software can be used. If a user desires to cancel such a restriction, the user needs to be registered with the supplier of the software or the information processing apparatus to acquire a character string for authentication or an electronic key, which needs to be downloaded in the software or the information processing apparatus. This method requires the user who is willing to cancel the restriction to perform registration steps. Furthermore, a server needs to be installed and managed, to function as the contact point for distributing character strings or electronic keys used for authentication. Accordingly, this method requires high costs.

There is another method of using a hardware key (see, for example, Patent Document 1). This method is performed on condition that the information processing apparatus is provided with a port to which a hardware key can be connected. Identification information is uniquely specified for each software product. Software is supplied to a user together with a key module associated with the software, which key module is constituted of hardware and includes a storage unit storing key information corresponding to the identification information of the software. The information processing apparatus can only execute software that corresponds to key information included in a key module connected to its port. With this method, if software is copied, the copy of the software cannot be executed unless a key module associated with the software is acquired or copied. Copying a key module is not easy and is also expensive. Therefore, unauthorized usage of software can be substantially prevented.

Patent Document 1: Japanese Laid-Open Patent Application No. 2005-38068

However, with the method of using a hardware key, a key module associated with software needs to be connected to the port of the information processing apparatus in order to execute the software. Thus, in order to use plural software products at the same time in a single information processing apparatus, the same number of key modules as the software products needs to be connected to the information processing apparatus. Accordingly, it is necessary to increase the space around the information processing apparatus according to the number of connected key modules corresponding to the number of software products used.

SUMMARY OF THE INVENTION

The present invention provides an unauthorized usage prevention system and an information processing apparatus in which one or more of the above-described disadvantages are eliminated.

A preferred embodiment of the present invention provides an unauthorized usage prevention system and an information processing apparatus capable of properly preventing unauthorized usage of plural software products by using key modules, without having to increase the space for key modules according to the number of connected key modules corresponding to the number of software products used at the same time.

An embodiment of the present invention provides an unauthorized usage prevention system including at least one software item uniquely associated with an identification information item; an information processing apparatus configured to perform execution of the software item in the event of receiving permission based on the identification information item, wherein the execution of the software item includes installation of the software item and operation of the software item; a key module including a storage storing a key information item uniquely associated with the identification information item of the software item; and a key information storage unit configured to hold the key information item of the key module, wherein the information processing apparatus includes a control unit configured to control the execution of the software item; an unauthorized usage prevention controller configured to prevent the execution controlled by the control unit; and a port to which the key module can be connected in such a manner that information can be exchanged between the unauthorized usage prevention controller and the key module, wherein the unauthorized usage prevention controller includes a connection recognition unit configured to recognize that the key module is connected to the port; and a key information copying unit configured to copy the key information item from the key module to the key information storage unit, wherein the key information copying unit copies the key information item from the key module to the key information storage unit in the event that the connection recognition unit recognizes that the key module is connected to the port; and the control unit of the information processing apparatus is configured to enable the execution of all of the software items with identification information items associated with the key information items held in the key information storage unit.

An embodiment of the present invention provides an information processing apparatus for performing execution of a software item in the event of receiving permission based on an identification information item uniquely associated with the software item, wherein the execution of the software item includes installation of the software item and operation of the software item, the information processing apparatus including a control unit configured to control the execution of the software item; an unauthorized usage prevention controller configured to prevent the execution controlled by the control unit; and a port to which a key module can be connected in such a manner that information can be exchanged between the unauthorized usage prevention controller and the key module, the key module including a storage storing a key information item uniquely associated with the identification information item of the software item, wherein the unauthorized usage prevention controller includes a connection recognition unit configured to recognize that the key module is connected to the port; and a key information copying unit configured to copy the key information item from the key module to a key information storage unit configured to hold the key information item of the key module, wherein the key information copying unit copies the key information item from the key module to the key information storage unit in the event that the connection recognition unit recognizes that the key module is connected to the port; and the control unit of the information processing apparatus is configured to enable the execution of all of the software items with the identification information items associated with the key information items held in the key information storage unit.

According to one embodiment of the present invention, an unauthorized usage prevention system and an information processing apparatus are provided, which are capable of properly preventing unauthorized usage of plural software products by using key modules, without having to increase the space for key modules according to the number of connected key modules corresponding to the number of software products used at the same time.

BRIEF DESCRIPTION OF THE DRAWINGS

Other objects, features and advantages of the present invention will become more apparent from the following detailed description when read in conjunction with the accompanying drawings, in which:

FIG. 3 is a diagram for describing the structure of a key information item stored in a key information storage unit (EEPROM) of a key module;

FIG. 4 is a block diagram for describing the structure and operations of an unauthorized usage prevention control unit in the information processing apparatus according to the first embodiment;

FIG. 9 is a diagram for describing the structure of a key information item stored in a key information storage unit (EEPROM) of a key module according to a third embodiment;

FIG. 10 is a block diagram for describing the structure and operations of an unauthorized usage prevention control unit in an information processing apparatus according to the third embodiment;

DETAILED DESCRIPTION OF THE PREFERRED EMBODIMENTS

A description is given, with reference to the accompanying drawings, of an embodiment of the present invention.

First Embodiment

Figure 1:
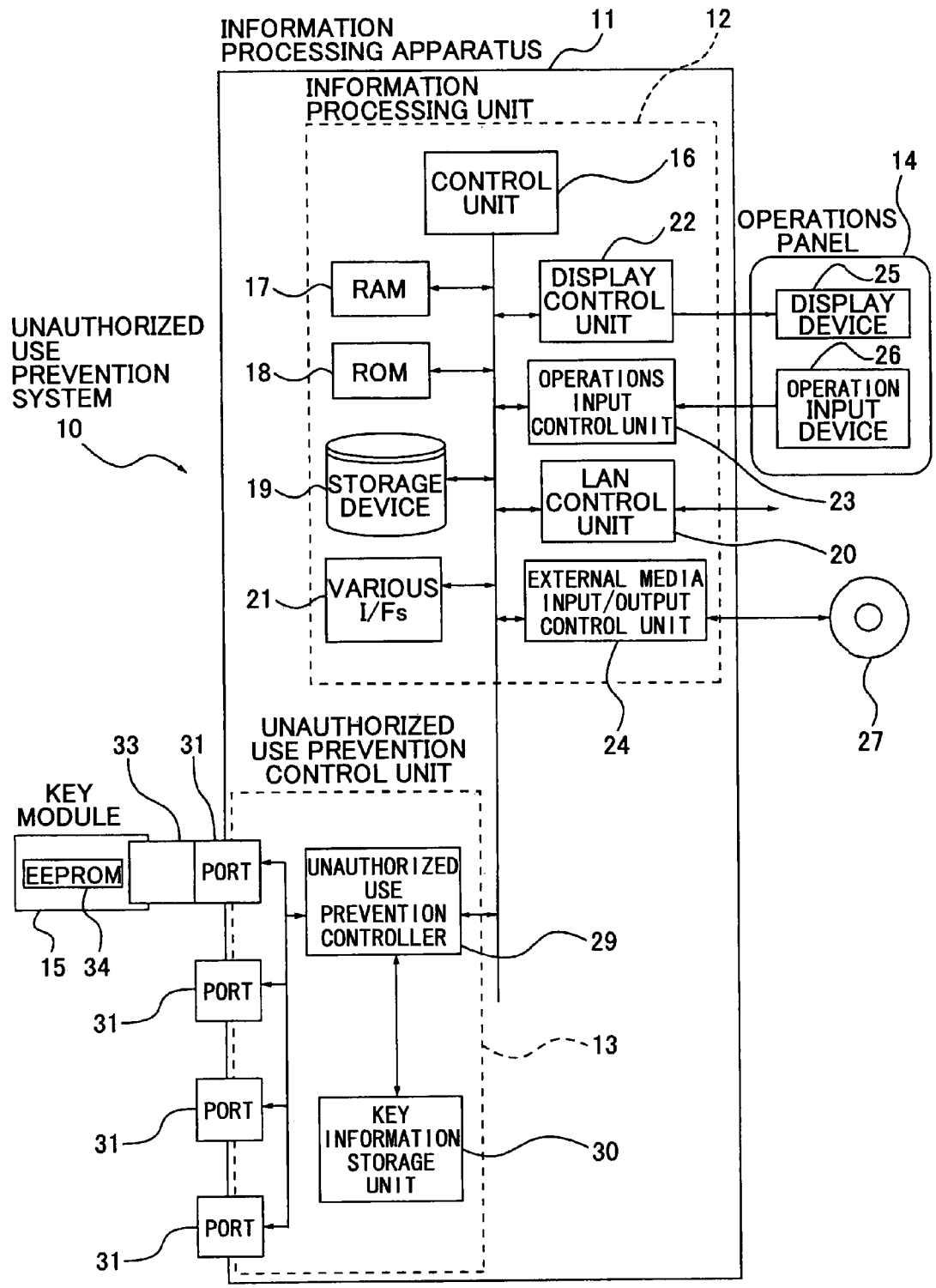
FIG. 1 is a block diagram of an information processing apparatus in which an unauthorized usage prevention system according to a first embodiment of the present invention is installed.

FIG. 1 is a block diagram of an information processing apparatus 11 in which an unauthorized usage prevention system 10 according to a first embodiment of the present invention is installed.

The information processing apparatus 11 includes an information processing unit 12 and an unauthorized usage prevention control unit 13, and has an operations panel 14 provided on the outside. The information processing unit 12, the unauthorized usage prevention control unit 13, and a key module 15 described below constitute the unauthorized usage prevention system 10.

The information processing unit 12 functions as a microcomputer controlled by a general-purpose OS (operating system) used in an information processing apparatus typically referred to as a personal computer.

The information processing unit 12 includes a control unit 16 including a CPU that is the main processor. The control unit 16 includes a RAM 17, a ROM 18, a storage device 19, and a LAN control unit 20 that are interconnected by a bus, so that signals can be exchanged between each other. The RAM 17 forms an operating area for the control unit 16. The ROM 18 is a read-only memory that stores startup programs, etc. The storage device 19 includes a HDD, and functions as a storage medium storing the OS and application programs executed by the control unit 16. The LAN control unit 20 is used for connecting the information processing unit 12 to a LAN.

Signals can be exchanged between the control unit 16 and various I/Fs 21, a display control unit 22, an operations input control unit 23, and an external media input/output control unit 24.

Figure 2:
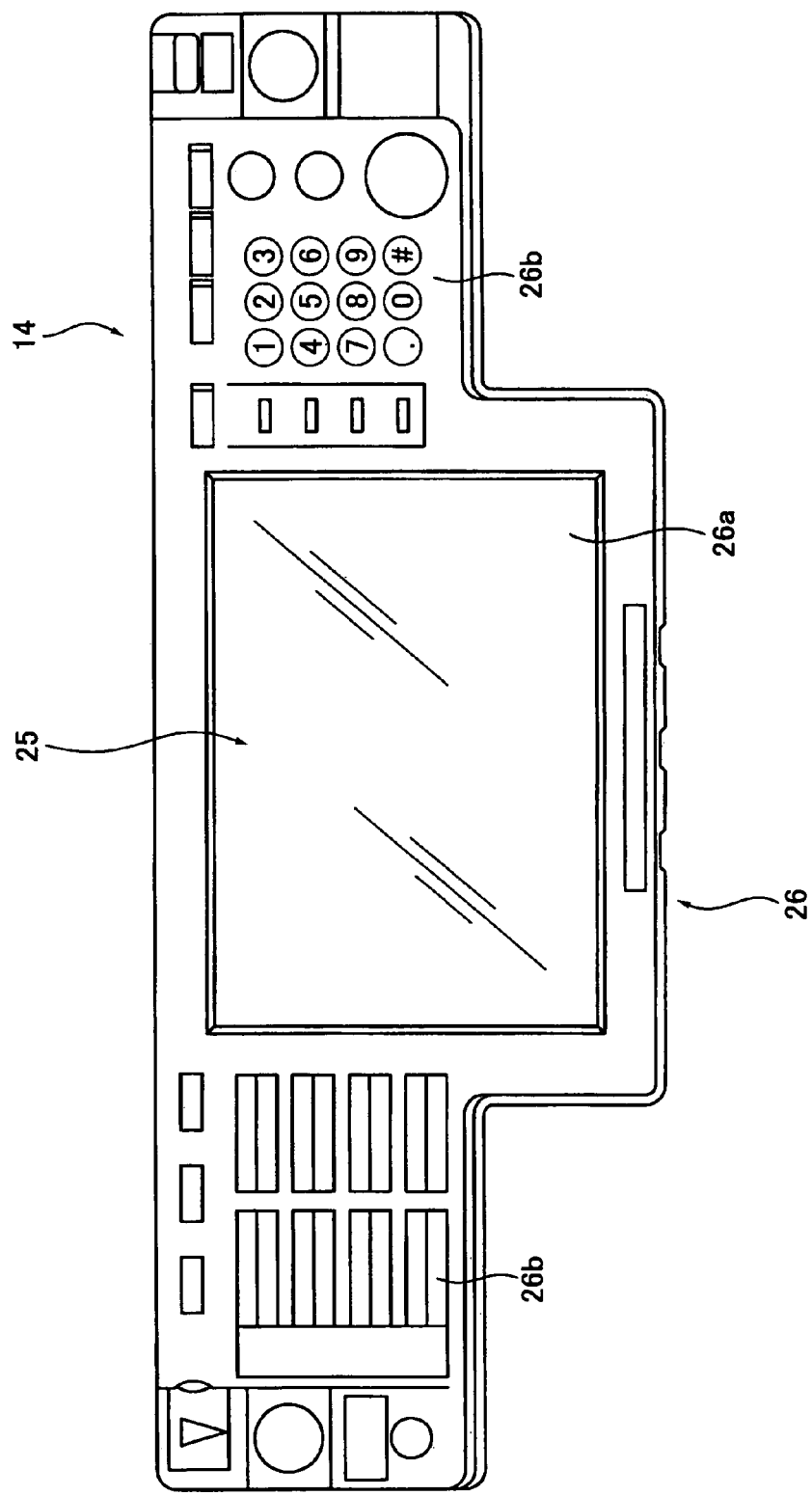
FIG. 2 is a partial schematic front view of an operations panel of the information processing apparatus.

The various I/Fs 21 include interfaces such as USB, IEEE 1394, SCSI, Bluetooth, UWB (Ultra Wide Band), and infrared rays, to which various devices (e.g., a digital camera) can be connected. Signals can be exchanged between the operations panel 14 and the display control unit 22 and the operations input control unit 23. FIG. 2 is a partial schematic front view of the operations panel 14 of the information processing apparatus 11.

The operations panel 14 includes a display device 25 and an operation input device 26. The display device 25 is, for example, an LCD (Liquid Crystal Display), for displaying an instruction input to the operation input device 26 and the operating status of the information processing apparatus 11. The displayed contents of the display device 25 are controlled by the display control unit 22. In the first embodiment, the display device 25 includes a resistive touch panel 26a with a thin film laminated on its surface. The operation input device 26 includes the touch panel 26a of the display device 25 and a keyboard unit 26b including plural operation buttons provided near the touch panel 26a. An instruction input to the operation input device 26 is transmitted via the operations input control unit 23 to the control unit 16, to execute various operations.

When power is applied to the information processing apparatus 11 by a user's operation, the control unit 16 starts up a startup program in the ROM 18, loads an OS from the storage device 19 to the RAM 17, and starts up the OS. The OS starts up a program in response to a user's operation, reads information, and saves information. Windows (registered trademark) is a typically known OS. Operation programs that operate on such an OS are referred to as application programs.

The external media input/output control unit 24 controls operations for reading various program codes (control programs) and image data of the OS, device drivers, and various application programs that are held in a storage medium 27, or for writing program codes and image data into the storage medium 27. Examples of the storage medium 27 are a flexible disk (FD), a hard disk (HDD), an optical disk (CD-ROM, CD-R, CD-RW, DVD-ROM, DVD-RAM, DVD-R, DVD+R, DVD-RW, DVD+RW, etc.), a magneto-optical disk (MO), and a semiconductor medium.

Accordingly, application programs held in the storage medium 27 can be installed and stored (held) in the storage device 19. Thus, the storage medium 27 can hold the application programs, i.e., the storage medium 27 can function as a recording medium for holding the application programs. Furthermore, the application programs can be acquired from the outside via the LAN control unit 20 and installed in the storage device 19 or the RAM 17.

The unauthorized usage prevention control unit 13 is provided to prevent unauthorized usage of a software item 28 (see FIG. 3) such as an application program that is installed and executed by the information processing unit 12.

The unauthorized usage prevention control unit 13 includes an unauthorized usage prevention controller 29, a key information storage unit 30, and plural ports 31. The unauthorized usage prevention control unit 13 operates in accordance with a key information item 32 (see FIG. 3) stored in the key module 15.

The key module 15 is a module of a key that is equipped with a nonvolatile memory and that is constituted of hardware, and is also referred to as a hardware key. The key module 15 has a connection mouth 33 that is the portion to be connected to the port 31. In the first embodiment, an EEPROM 34 is installed in the key module 15 as the nonvolatile memory. The EEPROM 34 stores different key information items 32, and signals are exchanged between the EEPROM 34 and the unauthorized usage prevention controller 29 via the connection mouth 33 and the port 31 connected to the connection mouth 33.

The key information item 32 is uniquely specified for each of the plural software items 28. Each key information item 32 includes at least an identification number of the corresponding software item 28 and key information for cancelling a usage restriction applied to the software item 28. An example of the key information item 32 is shown in FIG. 3. FIG. 3 is a diagram for describing the structure of the key information item 32 stored in the EEPROM 34 of the key module 15.

A Signature area is for storing a specific character string for determining whether the key module 15 (hardware key) is valid/invalid. As described below, by detecting that a specific character string is properly saved in this area, a connection recognition unit 35 of the unauthorized usage prevention controller 29 determines that the key module 15 is valid. A CRC 16 area contains the value of CRC (Cyclic Redundancy Check) of areas from an address 20h through the final address. An Application Guide area contains an identification number assigned to each software item 28. An Authentication ID is authentication data individually provided for the software item 28, and corresponds to the key information item of the software item 28 as described above. By reading the data saved in this area, the corresponding software item 28 becomes usable. The key information storage unit 30 is provided for holding the key information item 32 in the unauthorized usage prevention control unit 13.

The key information storage unit 30 is constituted of a volatile memory, and is configured to simultaneously hold plural key information items 32 corresponding to plural different software items 28. In the key information storage unit 30, plural different key information items 32 are saved in consecutive storage areas. Accordingly, in a group including plural key information items 32, the starting address of each key information item 32 is determined by searching for specific character strings saved in the Signature area corresponding to the leading portion of the address of each key information item 32. The method of determining the starting address of each key information item 32 in the key information storage unit 30 is not limited to that of the first embodiment; another method is to provide, in the key information storage unit 30, a location table of the key information items 32 written in the key information storage unit 30 (a table including the Application Guide and the starting address of each key information item 32). In this case, every time a new key information item 32 is added into the key information storage unit 30, an Application Guide and a starting address is added to the key information location table. The port 31 is provided for connecting the key module 15 including the key information item 32 to the unauthorized usage prevention control unit 13.

The port 31 is provided on the information processing apparatus 11, and the connection mouth 33 of the key module 15 can fit into the port 31. When the connection mouth 33 is fit into the port 31, the EEPROM 34 of the key module 15 and the unauthorized usage prevention controller 29 are electrically connected. In the first embodiment, plural ports 31 having the same structure are provided (see FIG. 1). Each port 31 acts as a gateway through which signals are exchanged between the EEPROM 34 of the connected key module 15 and the unauthorized usage prevention controller 29.

The unauthorized usage prevention controller 29 determines whether the software item 28 can be used based on the key information item 32 stored in the EEPROM 34 of the key module 15 connected to each port 31. FIG. 4 is a block diagram for describing the structure and operations of the unauthorized usage prevention control unit 13 in the information processing apparatus 11. As plural ports 31 are assumed to have the same structure, only one port 31 is described from FIG. 4 onward, and descriptions for the rest of the ports 31 are omitted.

As shown in FIG. 4, the unauthorized usage prevention controller 29 includes the connection recognition unit 35, a key information searching unit 36, a key information status detecting unit 37, a key information copying unit 38, and an execution permitting unit 39, which can exchange information with each other in a linear manner.

The connection recognition unit 35 can acquire information from the port 31, and recognize whether the key module 15 is connected to the port 31. Additionally, in the first embodiment, the connection recognition unit 35 can detect a specific character string saved in the Signature area (see FIG. 3) of the key information item 32 stored in the EEPROM 34 of the key module 15 connected to the port 31. In the first embodiment, the connection recognition unit 35 can recognize/determine that the connected key module 15 is valid by detecting that the specific character string is properly saved. Furthermore, the connection recognition unit 35 can output to the execution permitting unit 39 that a valid key module 15 is not connected. In the first embodiment, the connection recognition unit 35 can recognize which ports 31 have a key module 15 connected.

The key information searching unit 36 can acquire information of the EEPROM 34 of the key module 15 connected to the port 31, and can search the information held in the key information storage unit 30. The key information searching unit 36 can perform a search to determine whether the key information item 32 stored in the EEPROM 34 of the key module 15 connected to the port 31 is held in the key information storage unit 30. Specifically, in the first embodiment, in order to determine whether the key information item 32 of the key module 15 is held in the key information storage unit 30, the key information searching unit 36 searches the data held in the key information storage unit 30 for a software identification number that corresponds to the software identification number saved in the Application Guide area (see FIG. 3) of the key information item 32 stored in the EEPROM 34 of the connected key module 15. The key information searching unit 36 can output to the execution permitting unit 39 that a corresponding key information item 32 has been found. As long as the key information searching unit 36 can search for the target key information item 32 among the information items held in the key information storage unit 30, the method is not limited to that of the first embodiment.

The key information status detecting unit 37 acquires information from the EEPROM 34 of the key module 15 connected to the port 31 and detects whether the key information item 32 stored in the EEPROM 34 of the key module 15 connected to the port 31 is proper. In the first embodiment, the key information status detecting unit 37 can detect the authentication data individually provided for each software item 28 saved in the Authentication ID area and the CRC value saved in the CRC 16 area (see FIG. 3) of the key information item 32 stored in the EEPROM 34 of the key module 15 connected to the port 31. When the key information status detecting unit 37 detects that the individual authentication data and the CRC value are properly saved, the key information status detecting unit 37 can determine that the key information item 32 is in a proper status. The key information status detecting unit 37 can output to the execution permitting unit 39 that the key information item 32 is not in a proper status.

The key information copying unit 38 can acquire information from the EEPROM 34 of the key module 15 connected via the port 31, and can copy the key information item 32 stored in the EEPROM 34 of the key module 15 connected to the port 31, and save it in the key information storage unit 30. That is, the key information copying unit 38 can copy the key information item 32 and save it in the key information storage unit 30 without erasing the key information item 32 in the EEPROM 34.

The execution permitting unit 39 can output, to the control unit 16 of the information processing unit 12, signals for permitting execution of all software items 28 corresponding to plural key information items 32 held in the key information storage unit 30. When these signals are input to the control unit 16, the control unit 16 can operate the software item 28 corresponding to the signals, i.e., the control unit 16 can install the software item 28 and execute operations of the installed software item 28.

Next, the operation of the unauthorized usage prevention system 10 according to the first embodiment of the present invention is described with reference to a flowchart shown in FIG. 5.

Figure 5:
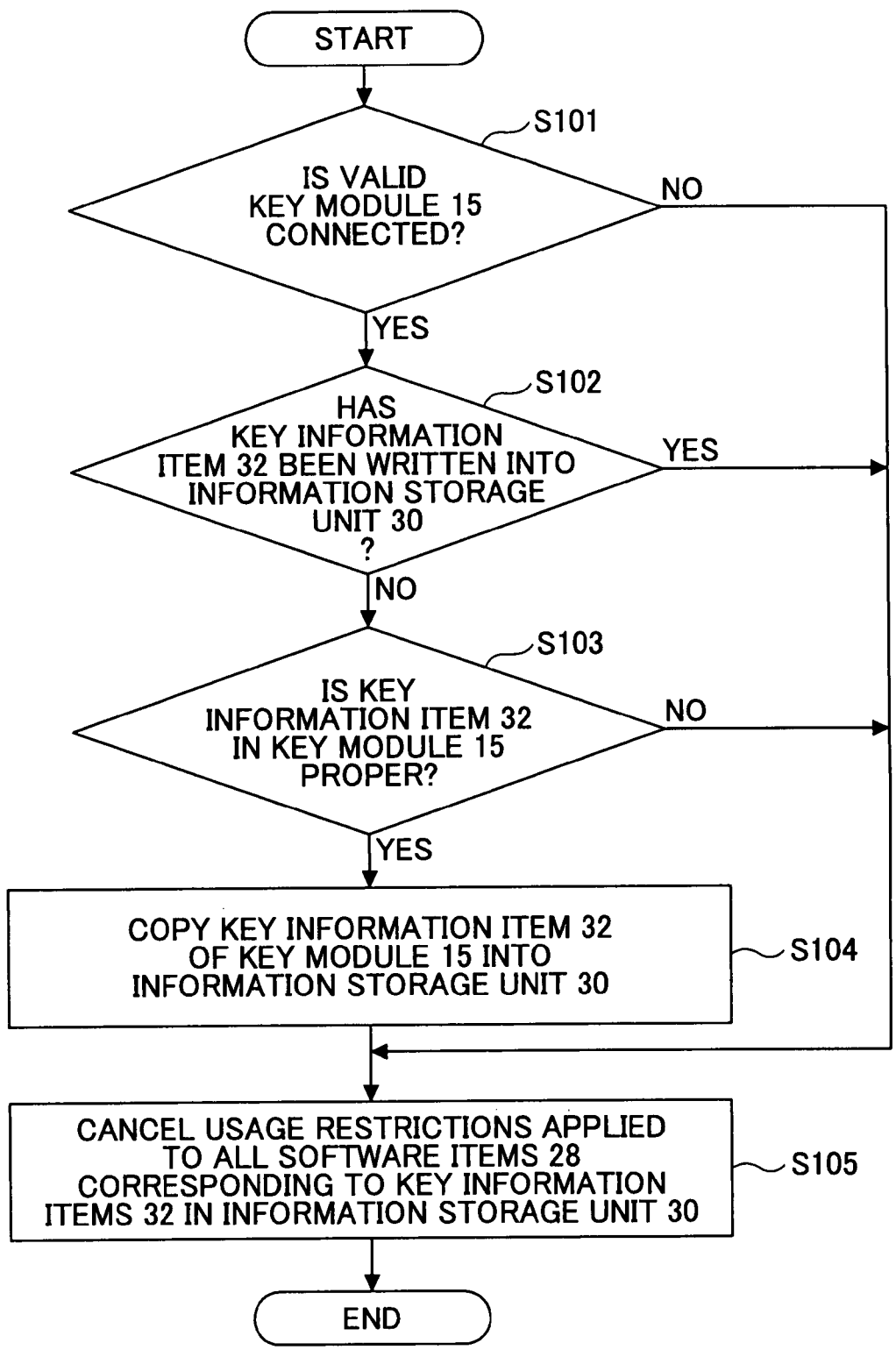
FIG. 5 is a flowchart of an operation performed by the unauthorized usage prevention control unit according to the first embodiment.

When the information processing apparatus 11 is started up and when a key module 15 is newly connected to at least one of the ports 31, the process of the flowchart shown in FIG. 5 starts.

The connection recognition unit 35 of the unauthorized usage prevention controller 29 of the unauthorized usage prevention control unit 13 recognizes whether a valid key module 15 is connected to any of the ports 31 (step S101). When a valid key module 15 is connected, the process proceeds to step S102. When a valid key module 15 is not connected, the process proceeds to step S105.

When a valid key module 15 is connected, the key information searching unit 36 of the unauthorized usage prevention controller 29 searches the key information storage unit 30 to confirm whether the key information item 32 stored in the EEPROM 34 of the valid key module 15 is held in the key information storage unit 30 (step S102). When it is not held in the key information storage unit 30, the process proceeds to step S103, and when it is held in the key information storage unit 30, the process proceeds to step S105.

When the key information item 32 stored in the EEPROM 34 of the connected key module 15 is not held in the key information storage unit 30, the key information status detecting unit 37 of the unauthorized usage prevention controller 29 detects whether the key information item 32 is proper, before saving the key information item 32 into the key information storage unit 30 (step S103). When it is proper, the process proceeds to step S104, and when it is not proper, the process proceeds to step S105.

When the key information item 32 stored in the EEPROM 34 of the connected key module 15 is proper, the key information copying unit 38 of the unauthorized usage prevention controller 29 copies the key information item 32 into the key information storage unit 30 (step S104). When the copying operation is completed, the process proceeds to step S105.

The execution permitting unit 39 of the unauthorized usage prevention controller 29 outputs, to the control unit 16 of the information processing unit 12, signals for permitting execution of all of the software items 28 corresponding to plural key information items 32 held in the key information storage unit 30 (step S105). The control unit 16 of the information processing unit 12 can perform various execution operations only for the software items 28 corresponding to the signals for permitting various execution operations, which signals are received from the execution permitting unit 39.

As described above, in the unauthorized usage prevention system 10, when the information processing apparatus 11 is started up and when the key module 15 is newly connected to at least one of the ports 31, the process of the flowchart shown in FIG. 5 starts. Therefore, it is possible to prevent unauthorized usage of the software item 28 in the information processing apparatus 11. In the information processing apparatus 11, the control unit 16 of the information processing unit 12 performs the various execution operations of the software item 28. The control unit 16 can perform various execution operations only for the software item 28 corresponding to the key information item 32 held in the key information storage unit 30. The key information item 32 is copied into the key information storage unit 30 from the EEPROM 34 of the key module 15 provided together with the software item 28, only if the software item 28 is acquired legitimately. Thus, a user who has legitimately acquired the software item 28 can cause the information processing apparatus 11 to perform various execution operations with the software item 28 and a user who has illegitimately acquired the software item 28 is prevented from causing the information processing apparatus 11 to perform various execution operations with the software item 28.

The unauthorized usage prevention system 10 can perform various execution operations only for the software item 28 corresponding to the key information item 32 held in the key information storage unit 30. Therefore, the software item 28 can be used without keeping the key module 15 connected to the port 31, which key module 15 corresponds to the software item 28 to be used (with which various execution operations are to be performed).

In the unauthorized usage prevention system 10, the key information storage unit 30 is capable of holding plural key information items 32 at the same time, and therefore, plural key information items 32 can be collected in the key information storage unit 30. Accordingly, plural software items 28 can be used at the same time without keeping the corresponding key modules 15 connected to the ports 31.

In the unauthorized usage prevention system 10, as the key information storage unit 30 is a volatile memory, the key information item 32 held in the key information storage unit 30 is erased when the information processing apparatus 11 stops operating. Hence, in order to use the software item 28 after starting up the information processing apparatus 11 once again, the key module 15 corresponding to the software item 28 needs to be connected once again to the port 31. Therefore, unauthorized usage of the software item 28 can be properly prevented with the use of the key module 15.

Thus, the unauthorized usage prevention system 10 according to the first embodiment of the present invention is capable of properly preventing unauthorized usage of plural software items 28 by using the key modules 15, without having to increase the space for the key modules 15 according to the number of connected key modules 15 corresponding to the number of software items 28 used at the same time.

Second Embodiment

An unauthorized usage prevention system 210 according to a second embodiment of the present invention is described with reference to FIGS. 6 through 8. In the unauthorized usage prevention system 10 according to the first embodiment, the key information items 32 are collected in the key information storage unit 30, which is provided as a volatile memory in the information processing apparatus 11. Instead, in the second embodiment, the key information items 32 are collected in an EEPROM 234 of a key module 215. Otherwise, the unauthorized usage prevention system 210 according to the second embodiment basically has the same configuration and operates in the same manner as the unauthorized usage prevention system 10 of the first embodiment, and therefore, common elements and common operations are not further described.

Figure 6:
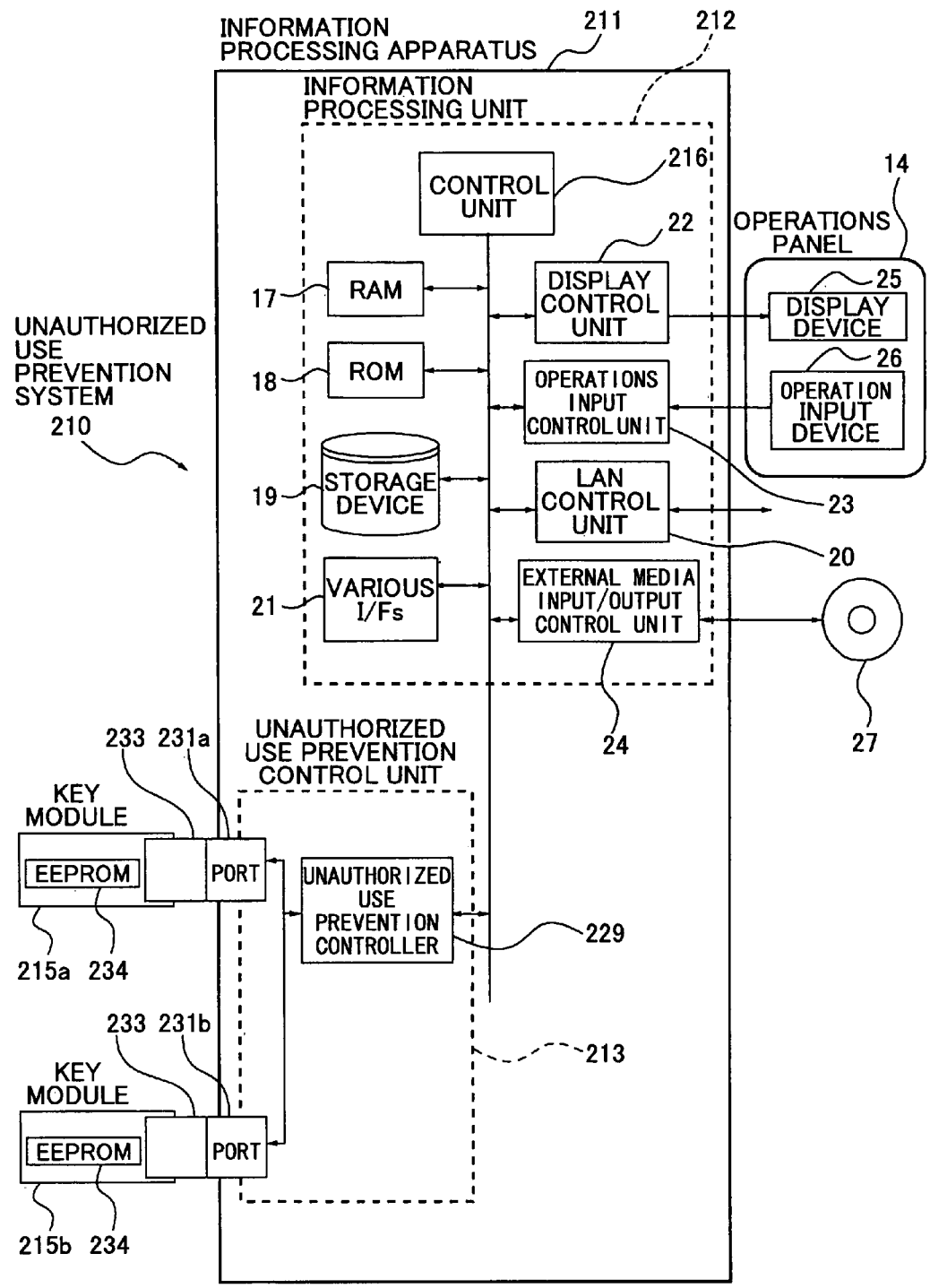
FIG. 6 is a block diagram of an information processing apparatus in which an unauthorized usage prevention system according to a second embodiment of the present invention is installed.

As shown in FIG. 6, in the unauthorized usage prevention system 210, an information processing apparatus 211 is provided with two ports 231a and 231b. Both of the ports 231a and 231b have basically the same structure as the port 31 of the first embodiment.

Figure 7:
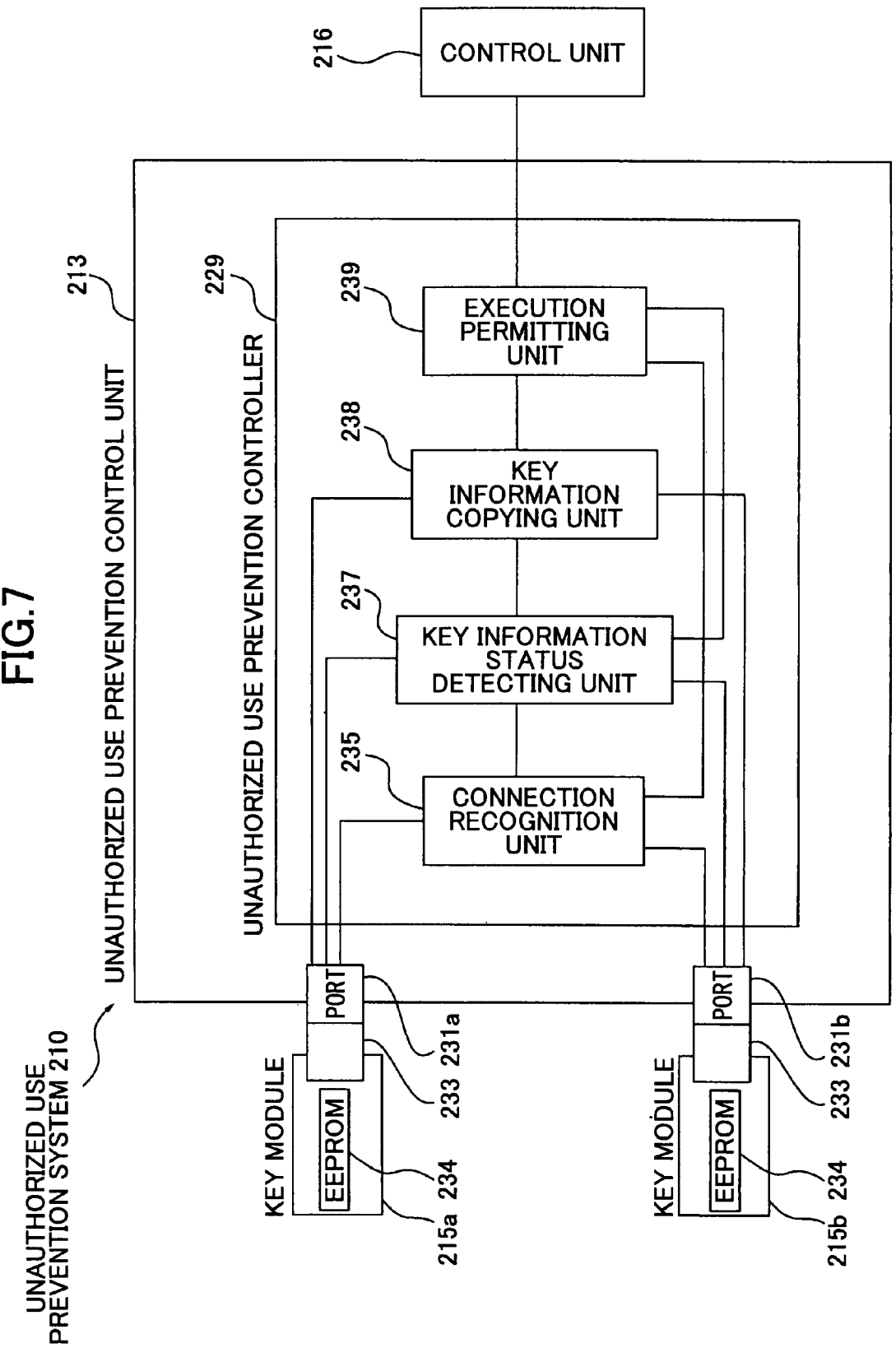
FIG. 7 is a block diagram for describing the structure and operations of an unauthorized usage prevention control unit in the information processing apparatus according to the second embodiment.

As shown in FIG. 7, an unauthorized usage prevention control unit 213 of the information processing apparatus 211 does not have the key information storage unit 30 (see FIG. 4). An unauthorized usage prevention controller 229 of the unauthorized usage prevention control unit 213 includes a connection recognition unit 235, a key information status detecting unit 237, a key information copying unit 238, and an execution permitting unit 239. These units basically operate in the same manner as those of the first embodiment. However, the connection recognition unit 235, the key information status detecting unit 237, and the key information copying unit 238 can exchange information with the two ports 231a and 231b. The key information status detecting unit 237 can detect whether the key information item 32 stored in the EEPROM 234 of the key module 215 is proper, and detect the number of key modules 215 including proper key information items 32.

Next, the operation of the unauthorized usage prevention system 210 according to the second embodiment of the present invention is described with reference to a flowchart shown in FIG. 8. In the following description, 215a denotes the key module connected to the port 231a, and 215b denotes the key module connected to the port 231b.

Figure 8:
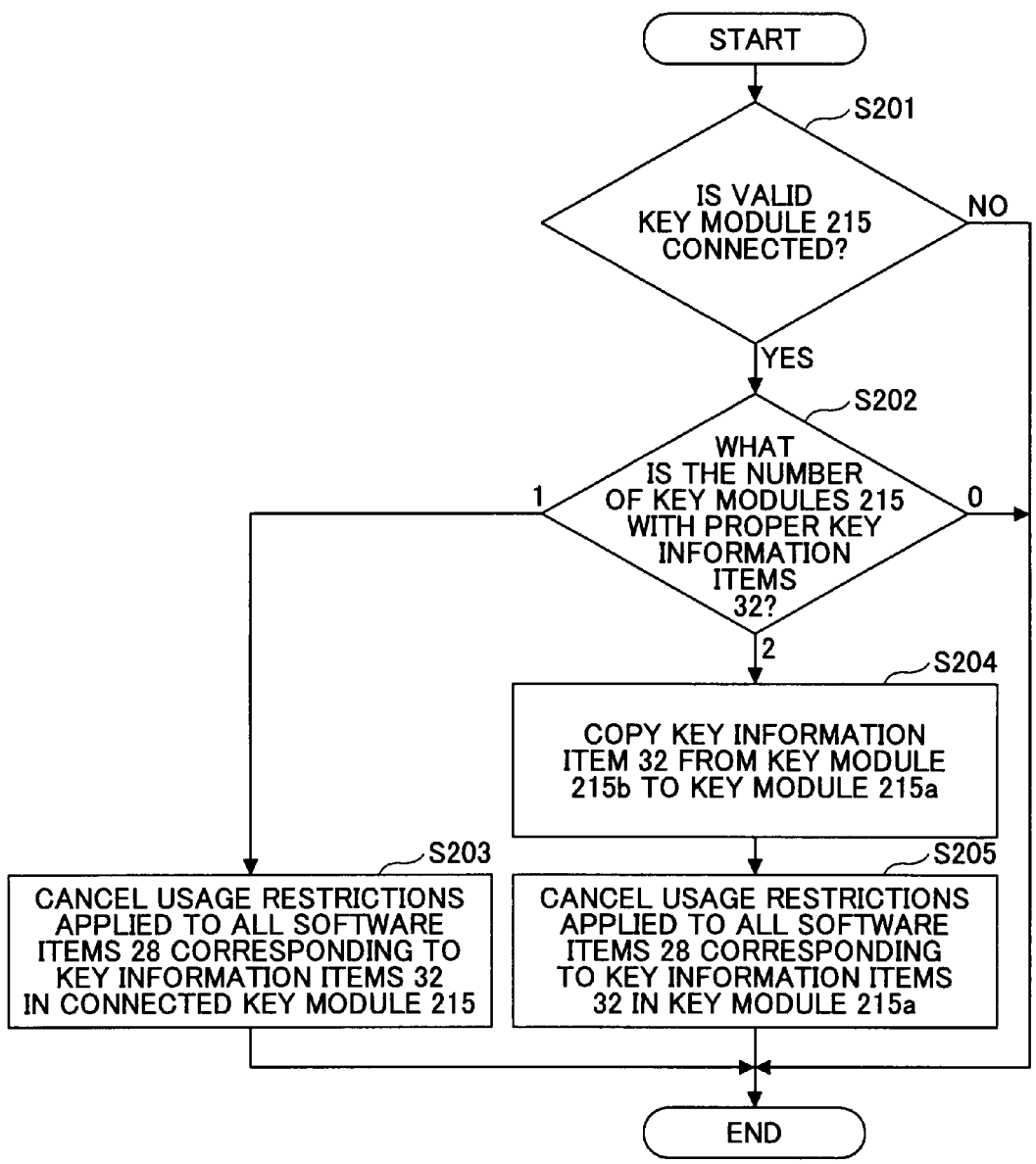
FIG. 8 is a flowchart of an operation performed by the unauthorized usage prevention control unit according to the second embodiment.

When the information processing apparatus 211 is started up and when a key module 215 is newly connected to at least one of the ports 231a and 231b, the process of the flowchart shown in FIG. 8 starts.

The connection recognition unit 235 of the unauthorized usage prevention controller 229 of the unauthorized usage prevention control unit 213 recognizes whether a valid key module 215 is connected to at least one of the ports 231a and 231b (step S201). When a valid key module 215 is connected, the process proceeds to step S202. When a valid key module 215 is not connected, the process of the flowchart shown in FIG. 8 ends.

When a valid key module 215 is connected to at least one of the ports 231a and 231b, the key information status detecting unit 237 of the unauthorized usage prevention controller 229 detects whether the key information item 32 is proper, which key information item 32 is stored in the EEPROM 234 of the connected key module 215, and detects the number of key modules 215 including proper key information items 32 (step S202). When the number of key modules 215 including proper key information items 32 is two, the process proceeds to step S204. When the number of key modules 215 including proper key information items 32 is one, the process proceeds to step S203. When the number of key modules 215 including proper key information items 32 is zero, the process of the flowchart shown in FIG. 8 ends.

When the number of key modules 215 including proper key information items 32 connected to the port 231 is one, the execution permitting unit 239 outputs, to a control unit 216 of an information processing unit 212, signals for permitting execution of the software item 28 corresponding to the proper key information item 32 (step S203). Then, the process of the flowchart shown in FIG. 8 ends.

When the number of key modules 215 including proper key information items 32 connected to the port 231 is two, i.e., the key modules 215 including the proper key information items 32 are connected to both of the ports 231a and 231b, the key information copying unit 238 of the unauthorized usage prevention controller 229 copies the key information item 32 stored in the EEPROM 234 of the key module 215b connected to the port 231b to the EEPROM 234 of the key module 215a connected to the port 231a (step S204). That is, the EEPROM 234 of the key module 215a is regarded as the key information storage unit. When the copying operation is completed, the process proceeds to step S205.

The execution permitting unit 239 of the unauthorized usage prevention controller 229 outputs, to the control unit 216 of the information processing unit 212, signals for permitting execution of all of the software items 28 corresponding to plural key information items 32 stored in the EEPROM 234 of the key module 215a (step S205). Then, the process of the flowchart shown in FIG. 8 ends.

As described above, in the unauthorized usage prevention system 210, when the information processing apparatus 211 is started up and when a key module 215 is newly connected to at least one of the ports 231a and 231b, the process of the flowchart shown in FIG. 8 starts. Therefore, it is possible to prevent unauthorized usage of the software item 28 in the information processing apparatus 211.

In the unauthorized usage prevention system 210, plural key information items 32 can be collected in the EEPROM 234 of the key module 215a connected to the port 231a. Accordingly, plural software items 28 can be used at the same time only by connecting a single key module 215 in which plural key information items 32 are collected, to the port 231a or the port 231b.

In the unauthorized usage prevention system 210, the EEPROM 234 of the key module 215 regarded as the key information storage unit is a nonvolatile memory, and therefore, once the key information items 32 are collected, they will never be erased. Hence, in order to use the software items 28 after starting up the information processing apparatus 11 once again, all of the software items 28 corresponding to the collected key information items 32 can be used only by connecting one of the key modules 215 with the plural key information items 32 collected therein, to the port 231a or the port 231b.

Thus, the unauthorized usage prevention system 210 according to the second embodiment of the present invention is capable of properly preventing unauthorized usage of plural software items 28 by using the key modules 215, without having to increase the space for the key modules 215 according to the number of connected key modules 215 corresponding to the number of software items 28 used at the same time.

In the second embodiment, the EEPROM 234 of the key module 215b connected to the port 231b acts as the copy source, and the key information item 32 is copied from the copy source to the EEPROM 234 of the key module 215a connected to the port 231a. However, the copy source is not limited to the second embodiment; the EEPROM 234 of the key module 215a connected to the port 231a can act as the copy source.

Third Embodiment

An unauthorized usage prevention system 310 according to a third embodiment of the present invention is described with reference to FIGS. 9 through 11. The difference between the unauthorized usage prevention system 210 according to the second embodiment is that in the unauthorized usage prevention system 310 according to the third embodiment, in addition to the key information item 32, copy permitting information 40 and copy unpermitting information 41 (see FIG. 11) can be saved in an EEPROM 334 of a key module 315. Furthermore, an unauthorized usage prevention controller 329 is provided with a copy permission information detecting unit 342 and a copy allowability rewriting unit 343. Otherwise, the unauthorized usage prevention system 310 according to the third embodiment basically has the same configuration and operates in the same manner as the unauthorized usage prevention system 210 of the second embodiment, and therefore, common elements and common operations are not further described.

The copy permitting information 40 is a signal for permitting the key information item 32 of the EEPROM 334 of the key module 315 to act as the copy source when the key information copying unit 238 copies the key information item 32. The copy unpermitting information 41 is a signal for not permitting the key information item 32 of the EEPROM 334 of the key module 315 to act as the copy source when the key information copying unit 238 copies the key information item 32. That is, the key information copying unit 238 copies the key information item 32 of the EEPROM 334 holding the copy permitting information 40 acting as the copy source to the key information storage unit; however, the key information item 32 of the EEPROM 334 holding the copy unpermitting information 41 never acts as the copy source. If a key information item 32 has been copied in the past (acting as the copy source) to a EEPROM 334 of another key module 315 for the purpose of key information registration, and the same key information item 32 of the key module 315 (that has acted as the copy source) can be copied again, it will mean that a practical duplicate copy of this key information item 32 is allowed to be made. In order to prevent such a duplicate copy from being made, the copy permitting information 40 is saved together with a key information item 32 that has never been used as a copy source (unused) to indicate that it is allowed to be used as a copy source; however, the copy unpermitting information 41 is saved together with a key information item 32 that has been used in the past as a copy source (used) to prevent it from being used again as a copy source. Accordingly, the copy permitting information 40 and the copy unpermitting information 41 also indicate whether the corresponding key information item 32 has been copied in the past to the EEPROM 334 of another key module 315 for the purpose of key information registration.

As shown in FIG. 9, in the third embodiment, the copy permitting information 40 or the copy unpermitting information 41 is saved in the Data copy status area of a key information item 332 of the EEPROM 334 of the key module 315. In the third embodiment, the copy permitting information 40 or the copy unpermitting information 41 is binary information using predetermined bits in the Data copy status area. In this case, the bit values are to be changed over depending on whether the EEPROM 334 of the key module 315 is unused or used. The copy allowability rewriting unit 343 changes the copy permitting information 40 into the copy unpermitting information 41 or changes the copy unpermitting information 41 into the copy permitting information 40. The copy permission information detecting unit 342 is provided in the unauthorized usage prevention controller 329 for detecting the copy permitting information 40 or the copy unpermitting information 41.

The copy permission information detecting unit 342 detects whether the copy permitting information 40 is saved or the copy unpermitting information 41 is saved in the EEPROM 334 of the key module 315 connected to the ports 231a and 231b. That is, it is possible to detect whether the key module 315 is unused or used.

Next, the operation of the unauthorized usage prevention system 310 according to the third embodiment of the present invention is described with reference to a flowchart shown in FIG. 11. In the following description, 315a denotes the key module connected to the port 231a, and 315b denotes the key module connected to the port 231b.

Figure 11:
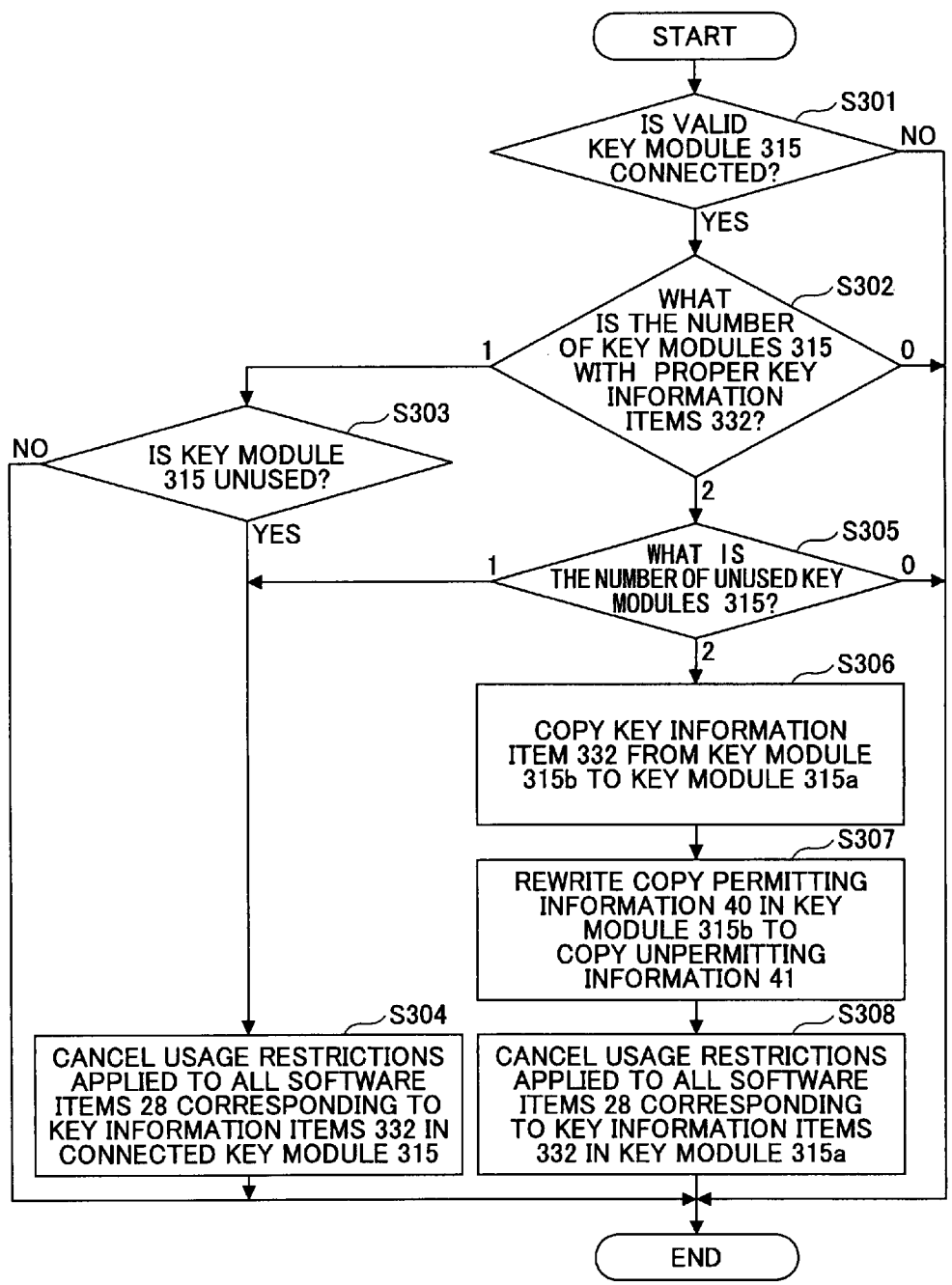
FIG. 11 is a flowchart of an operation performed by the unauthorized usage prevention control unit according to the third embodiment.

When the information processing apparatus 211 is started up and when a key module 315 is newly connected to at least one of the ports 231a and 231b, the process of the flowchart shown in FIG. 11 starts.

The connection recognition unit 235 of the unauthorized usage prevention controller 329 of an unauthorized usage prevention control unit 313 recognizes whether a valid key module 315 is connected to at least one of the ports 231a and 231b (step S301). When a valid key module 315 is connected, the process proceeds to step S302. When a valid key module 315 is not connected, the process of the flowchart shown in FIG. 11 ends.

When a valid key module 315 is connected to at least one of the ports 231a and 231b, the key information status detecting unit 237 of the unauthorized usage prevention controller 329 detects whether the key information item 332 is proper, which key information item 332 is stored in the EEPROM 334 of the connected key module 315, and detects the number of key modules 315 including proper key information items 332 (step S302). When the number of key modules 315 including proper key information items 332 is two, the process proceeds to step S305. When the number of key modules 315 including proper key information items 332 is one, the process proceeds to step S303. When the number of key modules 315 including proper key information items 332 is zero, the process of the flowchart shown in FIG. 11 ends.

When the number of key modules 315 including proper key information items 332 is one, the copy permission information detecting unit 342 detects whether the key module 315 is unused or used, i.e., the copy permission information detecting unit 342 detects whether the copy permitting information 40 is saved or the copy unpermitting information 41 is saved in the Data copy status area of the key information item 332 stored in the EEPROM 334 (step S303). When the key module 315 is unused, i.e., the copy permitting information 40 is saved, the process proceeds to step S304. When the key module 315 is used, i.e., the copy unpermitting information 41 is saved, the process of the flowchart shown in FIG. 11 ends.

When the number of unused key modules 315 including proper key information items 332 is one, the execution permitting unit 239 outputs, to the control unit 216 of the information processing unit 212, signals for permitting execution of the software item 28 corresponding to the proper key information item 332 (step S304). Then, the process of the flowchart shown in FIG. 11 ends.

When the number of key modules 315 including proper key information items 332 is two, i.e., the key modules 315 including the proper key information items 332 are connected to both of the ports 231a and 231b, the copy permission information detecting unit 342 of the unauthorized usage prevention controller 329 detects whether the key modules 315a, 315b respectively connected to the ports 231a, 231b are unused or used, and detects the number of unused key modules 315 (step S305). When the number of unused key modules 315 is two, the process proceeds to step S306, when the number of unused key modules 315 is one, the process proceeds to step S304, and when the number of unused key modules 315 is zero, the process of the flowchart shown in FIG. 11 ends.

When the number of unused key modules 315 including proper key information items 332 is two, i.e., the unused key modules 315 including the proper key information items 332 are connected to both of the ports 231a and 231b, the key information copying unit 238 of the unauthorized usage prevention controller 329 copies the key information item 332 stored in the EEPROM 334 of the key module 315b connected to the port 231b to the EEPROM 334 of the key module 315a connected to the port 231a (step S306). That is, the EEPROM 334 of the key module 315a is regarded as the key information storage unit. When the copying operation is completed, the process proceeds to step S307.

The copy allowability rewriting unit 343 of the unauthorized usage prevention controller 329 rewrites the copy permitting information 40 saved in the Data copy status area of the key information item 332 stored in the EEPROM 334 of the key module 315b, to the copy unpermitting information 41 (step S307). When the rewriting operation is completed, the process proceeds to step S308.

The execution permitting unit 239 of the unauthorized usage prevention controller 329 outputs, to the control unit 216 of the information processing unit 212, signals for permitting execution of all of the software items 28 corresponding to plural key information items 332 stored in the EEPROM 334 of the key module 315 connected to the port 231a (step S308). Then, the process of the flowchart shown in FIG. 11 ends.

As described above, in addition to the effects obtained by the unauthorized usage prevention system 210 according to the second embodiment, the unauthorized usage prevention system 310 is capable of preventing a user from using a key module 315 that has once acted as a copy source, i.e., a key module 315 that has been used, in order to cancel restrictions applied on various execution operations of the software item 28 corresponding to the key information item 332 of the used key module 315. Thus, it is possible to prevent the key information copying unit 238 of the execution permitting unit 239 from making a practical duplicate copy of the key information item 332 of the key module 315.

Fourth Embodiment

An unauthorized usage prevention system 410 according to a fourth embodiment of the present invention is described with reference to FIGS. 12 and 13. Among the key modules 315 connected to the ports 231a and 231b in the unauthorized usage prevention system 310 according to the third embodiment, in the fourth embodiment, one is designated as a master key and the other is designated as a slave key according to the total amount of information in the key information item 332 stored in the EEPROM 334. Otherwise, the unauthorized usage prevention system 410 according to the fourth embodiment basically has the same configuration and operates in the same manner as the unauthorized usage prevention system 310 of the third embodiment, and therefore, common elements and common operations are not further described.

Figure 12:
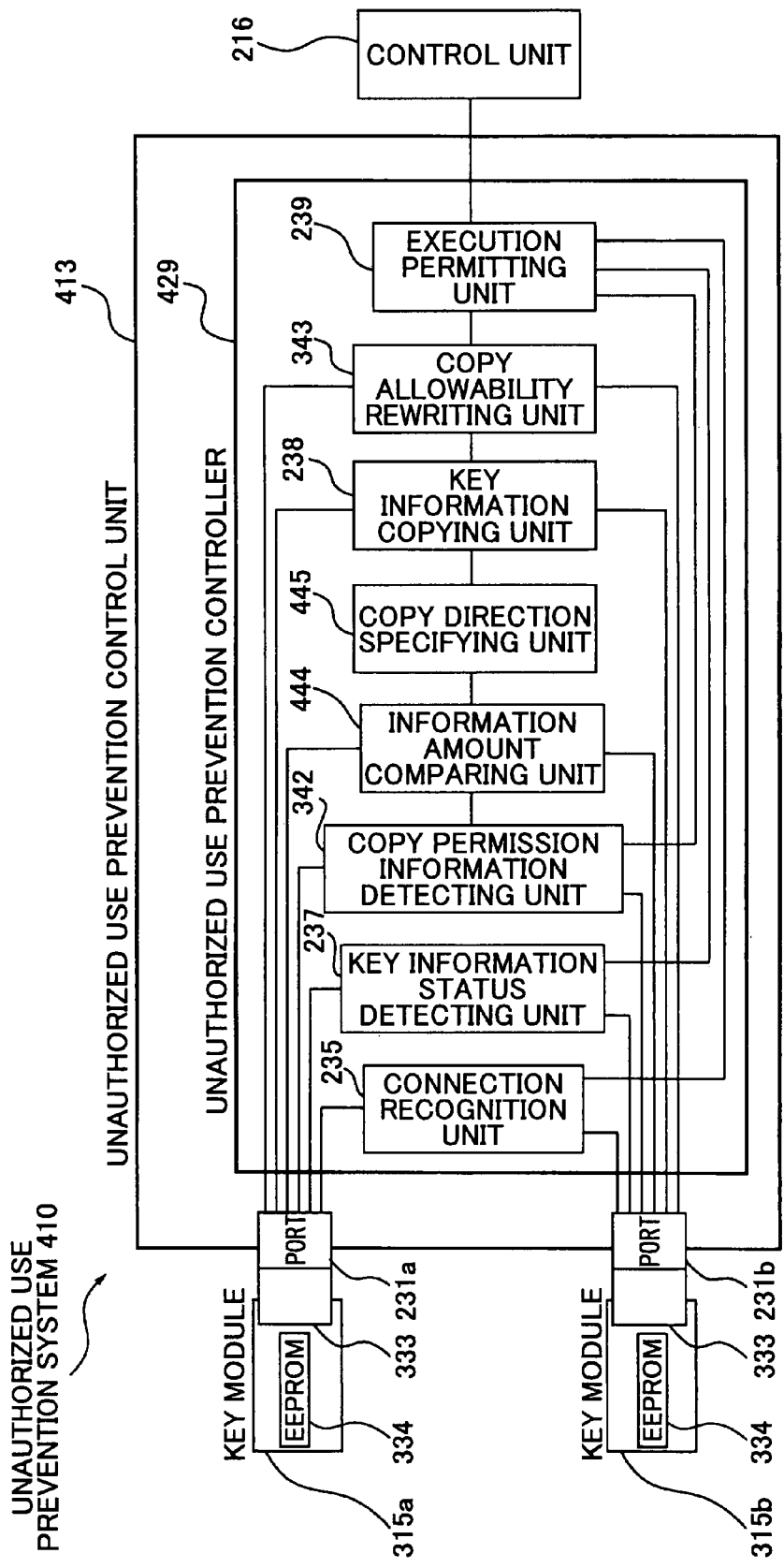
FIG. 12 is a block diagram for describing the structure and operations of an unauthorized usage prevention control unit in an information processing apparatus according to a fourth embodiment.

As shown in FIG. 12, an unauthorized usage prevention controller 429 includes an information amount comparing unit 444 and a copy direction specifying unit 445.

The information amount comparing unit 444 is capable of comparing the total information amounts of the key information items 332 stored in the EEPROMs 334 of the key modules 315a and 315b connected to the ports 231a and 231b.

Based on the result of comparing the total information amounts output by the information amount comparing unit 444, the copy direction specifying unit 445 designates one of the key modules 315a, 315b respectively connected to the ports 231a, 231b as the master key, and the other one as the slave key. In the fourth embodiment, the copy direction specifying unit 445 designates, as the master key, the key module 315 determined as having a larger total information amount; and designates, as the slave key, the key module 315 determined as having a smaller total information amount.

Next, the operation of the unauthorized usage prevention system 410 according to the fourth embodiment of the present invention is described with reference to a flowchart shown in FIG. 13.

Figure 13:
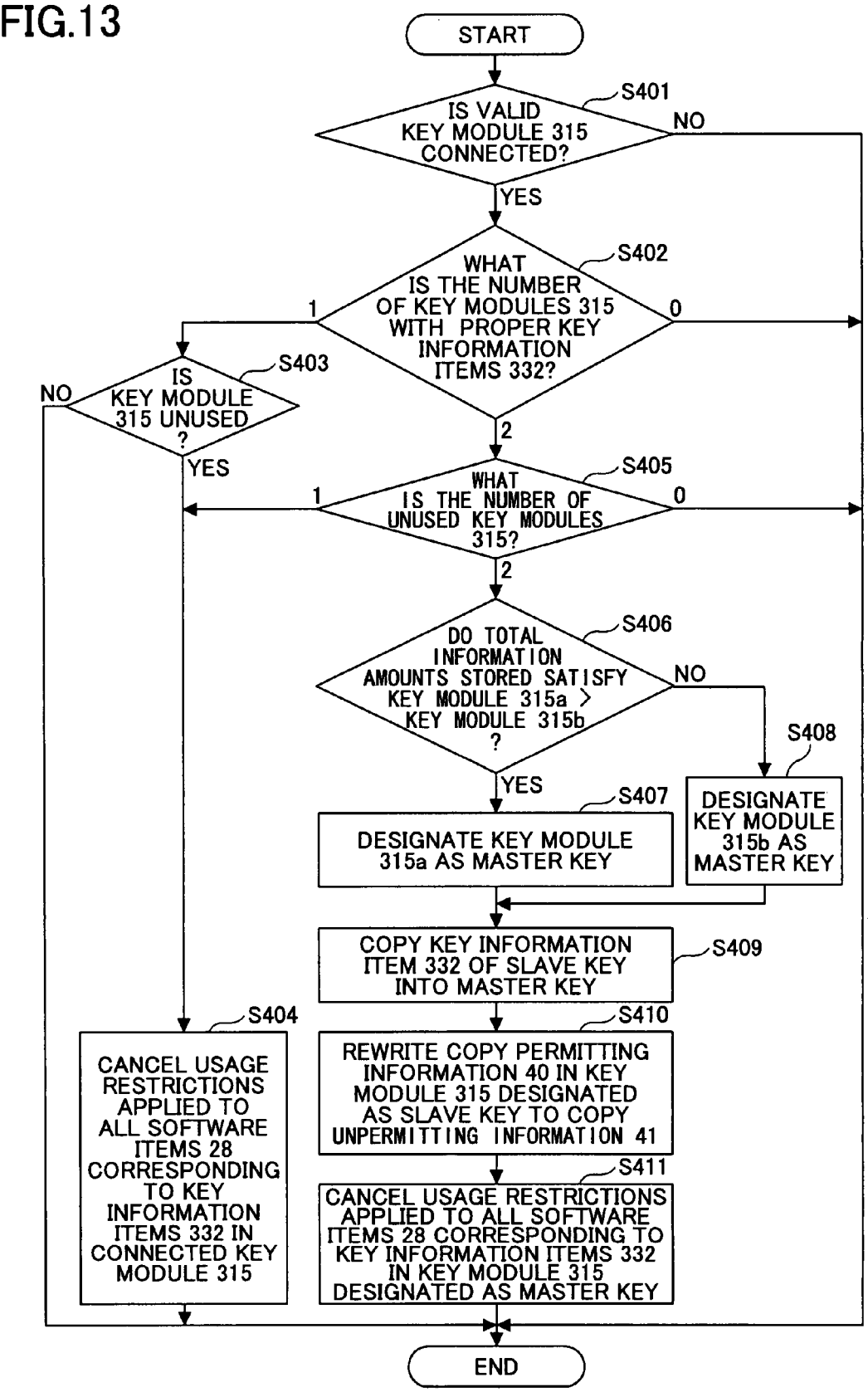
FIG. 13 is a flowchart of an operation performed by the unauthorized usage prevention control unit according to the fourth embodiment.

When the information processing apparatus 211 is started up and when a key module 315 is newly connected to at least one of the ports 231a and 231b, the process of the flowchart shown in FIG. 13 starts.

The connection recognition unit 235 of the unauthorized usage prevention controller 429 of an unauthorized usage prevention control unit 413 recognizes whether a valid key module 315 is connected to at least one of the ports 231a and 231b (step S401). When a valid key module 315 is connected, the process proceeds to step S402. When a valid key module 315 is not connected, the process of the flowchart shown in FIG. 13 ends.

When a valid key module 315 is connected to at least one of the ports 231a and 231b, the key information status detecting unit 237 of the unauthorized usage prevention controller 429 detects whether the key information item 332 is proper, which key information item 332 is stored in the EEPROM 334 of the connected key module 315, and detects the number of key modules 315 including proper key information items 332 (step S402). When the number of key modules 315 including proper key information items 332 is two, the process proceeds to step S405. When the number of key modules 315 including proper key information items 332 is one, the process proceeds to step S403. When the number of key modules 315 including proper key information items 332 is zero, the process of the flowchart shown in FIG. 13 ends.

When the number of key modules 315 including proper key information items 332 is one, the copy permission information detecting unit 342 detects whether the key module 315 is unused or used (step S403). When the key module 315 is unused, i.e., the copy permitting information 40 is saved, the process proceeds to step S404. When the key module 315 is used, i.e., the copy unpermitting information 41 is saved, the process of the flowchart shown in FIG. 13 ends.

When the number of unused key modules 315 including proper key information items 332 is one, the execution permitting unit 239 outputs, to the control unit 216 of the information processing unit 212, signals for permitting execution of the software item 28 corresponding to the proper key information item 332 (step S404). Then, the process of the flowchart shown in FIG. 13 ends.

When the number of key modules 315 including proper key information items 332 is two, i.e., the key modules 315 including the proper key information items 332 are connected to both of the ports 231a and 231b, the copy permission information detecting unit 342 of the unauthorized usage prevention controller 429 detects whether the key modules 315a, 315b respectively connected to the ports 231a, 231b are unused or used (step S405). When the number of unused key modules 315 is two, the process proceeds to step S406, when the number of unused key modules 315 is one, the process proceeds to step S404, and when the number of unused key modules 315 is zero, the process of the flowchart shown in FIG. 13 ends.

When the number of unused key modules 315 including proper key information items 332 is two, i.e., the unused key modules 315 including the proper key information items 332 are connected to both of the ports 231a and 231b, the information amount comparing unit 444 of the unauthorized usage prevention controller 429 compares the total information amounts of the plural key information items 332 stored in the EEPROMs 334 of the two key modules 315 (step S406). When the total information amount of the key information item 332 in the EEPROM 334 of the key module 315a connected to the port 231a is larger, the process proceeds to step S407, and when it is smaller (or when the amounts are equal, in the fourth embodiment), the process proceeds to step S408.

When the total information amount of the key information item 332 in the EEPROM 334 of the key module 315a connected to the port 231a is larger, the copy direction specifying unit 445 of the unauthorized usage prevention controller 429 designates the key module 315a as the master key, and designates the other one, i.e., the key module 315b connected to the port 231b, as the slave key (step S407). After these designations are made, the process proceeds to step S409.

When the total information amount of the key information item 332 in the EEPROM 334 of the key module 315b connected to the port 231b is larger (or when the amounts are equal, in the fourth embodiment), the copy direction specifying unit 445 of the unauthorized usage prevention controller 429 designates the key module 315b as the master key, and designates the other one, i.e., the key module 315a connected to the port 231a, as the slave key (step S408). After these designations are made, the process proceeds to step S409.

The copy direction specifying unit 445 of the unauthorized usage prevention controller 429 copies the key information item 332 stored in the EEPROM 334 of the key module 315 designated as the slave key to the EEPROM 334 of the key module 315 designated as the master key (step S409). That is, the EEPROM 334 of the key module 315 designated as the master key is regarded as the key information storage unit. When the copying operation is completed, the process proceeds to step S410.

The copy allowability rewriting unit 343 of the unauthorized usage prevention controller 429 rewrites the copy permitting information 40 saved in the Data copy status area of the key information item 332 stored in the EEPROM 334 of the key module 315 designated as the slave key, to the copy unpermitting information 41 (step S410). When the rewriting operation is completed, the process proceeds to step S411.

The execution permitting unit 239 of the unauthorized usage prevention controller 429 outputs, to the control unit 216 of the information processing unit 212, signals for permitting execution of all of the software items 28 corresponding to plural key information items 332 stored in the EEPROM 334 of the key module 315 designated as the master key (step S411). Then, the process of the flowchart shown in FIG. 13 ends.

As described above, in addition to the effects obtained by the unauthorized usage prevention system 310 according to the third embodiment, the unauthorized usage prevention system 410 according to the fourth embodiment can perform the operation of copying the key information item 332 in such a manner as to collect the key information items 332 into the EEPROM 334 of the key module 315 that is determined as having the largest total information amount of the key information item 332 stored therein. This reduces the amount of information exchanged in the operation of copying the key information item 332 performed by the key information copying unit 238. Accordingly, it is possible to save time required for the key information copying unit 238 to copy the key information item 332, and plural key information items 332 can be efficiently collected into the master key.

Fifth Embodiment

An unauthorized usage prevention system 510 according to a fifth embodiment of the present invention is described with reference to FIGS. 14 and 15. Among the key modules 315 connected to the ports 231a and 231b in the unauthorized usage prevention system 410 according to the fourth embodiment, in the fifth embodiment, one is designated as a master key and the other is designated as a slave key according to the storage capacity of the EEPROM 334. Otherwise, the unauthorized usage prevention system 510 according to the fifth embodiment basically has the same configuration and operates in the same manner as the unauthorized usage prevention system 410 of the fourth embodiment, and therefore, common elements and common operations are not further described.

Figure 14:
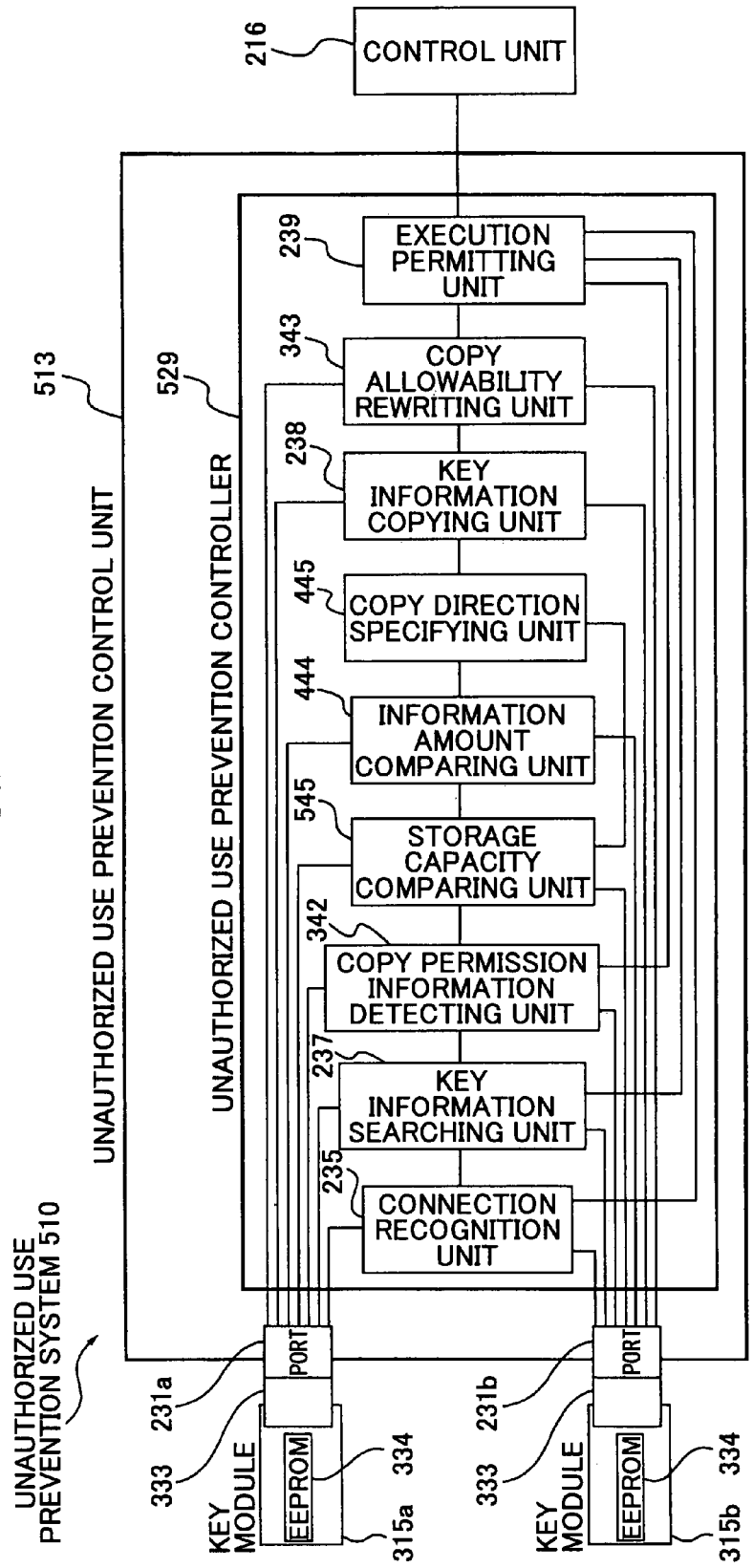
FIG. 14 is a block diagram for describing the structure and operations of an unauthorized usage prevention control unit in an information processing apparatus according to a fifth embodiment.

As shown in FIG. 14, an unauthorized usage prevention controller 529 includes a storage capacity comparing unit 545.

The storage capacity comparing unit 545 is capable of comparing the storage capacities of the EEPROMs 334 of the key modules 315a and 315b connected to the ports 231a and 231b.

Based on the comparison result of the total information amounts output by the information amount comparing unit 444 and the comparison result of the storage capacities output by the storage capacity comparing unit 545, the copy direction specifying unit 445 designates one of the key modules 315a, 315b respectively connected to the ports 231a, 231b as the master key and the other one as the slave key. In the fifth embodiment, the copy direction specifying unit 445 designates the key module 315 determined as having a larger storage capacity as the master key and designates the key module 315 determined as having a smaller storage capacity as the slave key. If the storage capacities are the same, the copy direction specifying unit 445 designates the key module 315 determined as having a larger total information amount as the master key and designates the key module 315 determined as having a smaller total information amount as the slave key.

Next, the operation of the unauthorized usage prevention system 510 according to the fifth embodiment of the present invention is described with reference to a flowchart shown in FIG. 15.

Figure 15:
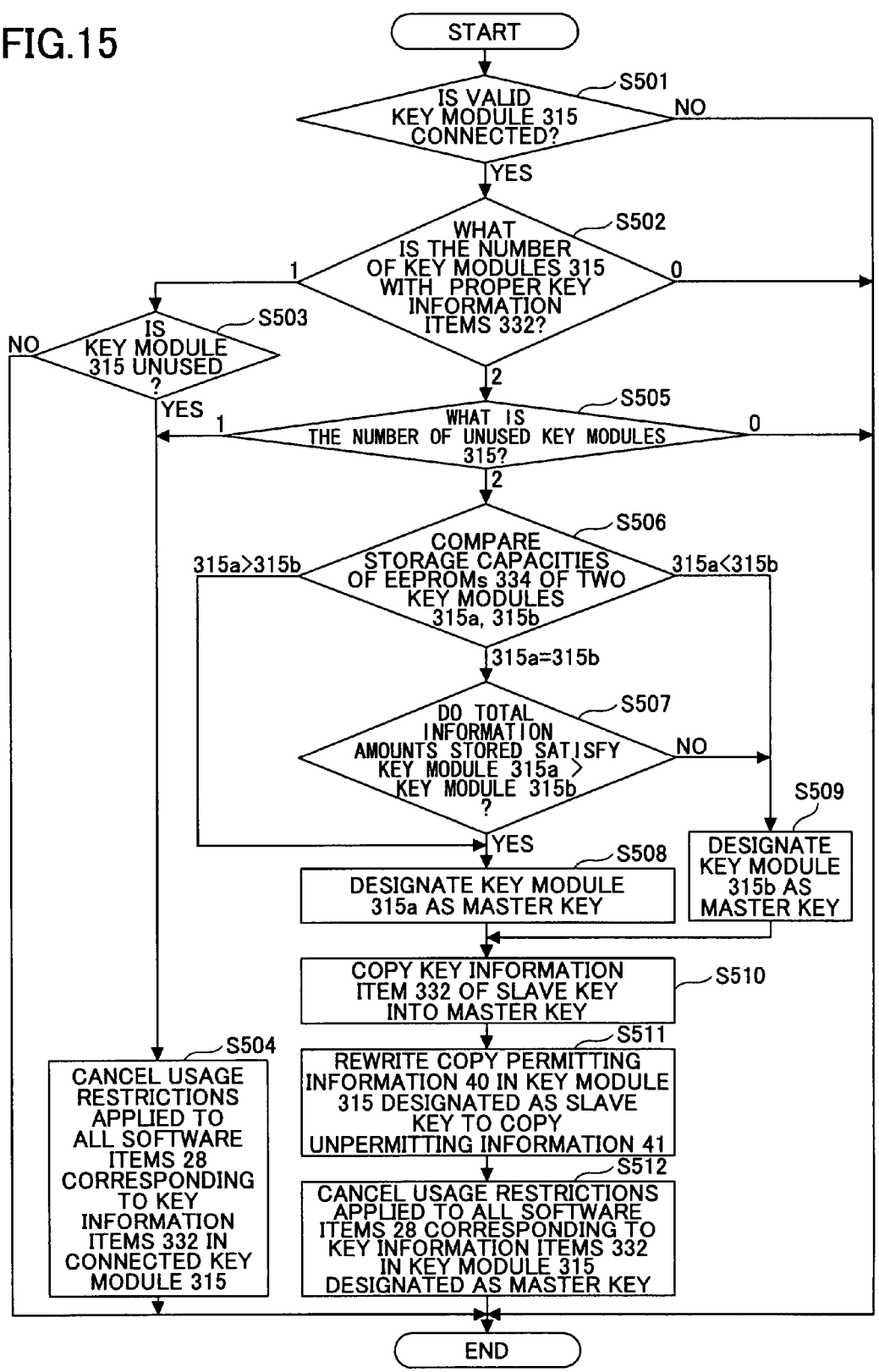
FIG. 15 is a flowchart of an operation performed by the unauthorized usage prevention control unit according to the fifth embodiment.

When the information processing apparatus 211 is started up and when a key module 315 is newly connected to at least one of the ports 231a and 231b, the process of the flowchart shown in FIG. 15 starts.

The connection recognition unit 235 of the unauthorized usage prevention controller 529 of an unauthorized usage prevention control unit 513 recognizes whether a valid key module 315 is connected to at least one of the ports 231a and 231b (step S501). When a valid key module 315 is connected, the process proceeds to step S502. When a valid key module 315 is not connected, the process of the flowchart shown in FIG. 15 ends.

When a valid key module 315 is connected to at least one of the ports 231a and 231b, the key information status detecting unit 237 of the unauthorized usage prevention controller 529 detects whether the key information item 332 is proper, which key information item 332 is stored in the EEPROM 334 of the connected key module 315, and detects the number of key modules 315 including proper key information items 332 (step S502). When the number of key modules 315 including proper key information items 332 is two, the process proceeds to step S505. When the number of key modules 315 including proper key information items 332 is one, the process proceeds to step S503. When the number of key modules 315 including proper key information items 332 is zero, the process of the flowchart shown in FIG. 15 ends.

When the number of key modules 315 including proper key information items 332 is one, the copy permission information detecting unit 342 detects whether the key module 315 is unused or used (step S503). When the key module 315 is unused, i.e., the copy permitting information 40 is saved, the process proceeds to step S504. When the key module 315 is used, i.e., the copy unpermitting information 41 is saved, the process of the flowchart shown in FIG. 15 ends.

When the number of unused key modules 315 including proper key information items 332 is one, the execution permitting unit 239 outputs, to the control unit 216 of the information processing unit 212, signals for permitting execution of the software item 28 corresponding to the proper key information item 332 (step S504). Then, the process of the flowchart shown in FIG. 15 ends.

When the number of key modules 315 including proper key information items 332 is two, i.e., the key modules 315 including the proper key information items 332 are connected to both of the ports 231a and 231b, the copy permission information detecting unit 342 of the unauthorized usage prevention controller 529 detects whether the key modules 315a, 315b respectively connected to the ports 231a, 231b are unused or used (step S505). When the number of unused key modules 315 is two, the process proceeds to step S506, when the number of unused key modules 315 is one, the process proceeds to step S504, and when the number of unused key modules 315 is zero, the process of the flowchart shown in FIG. 15 ends.

When the number of unused key modules 315 including proper key information items 332 is two, i.e., the unused key modules 315 including the proper key information items 332 are connected to both of the ports 231a and 231b, the storage capacity comparing unit 545 of the unauthorized usage prevention controller 529 compares the storage capacities of the EEPROMs 334 of the two key modules 315a, 315b (step S506). When the storage capacity of the EEPROM 334 of the key module 315a connected to the port 231a is larger, the process proceeds to step S508, and when it is smaller, the process proceeds to step S509, and when the storage capacities are equal, the process proceeds to step S507.

When the unused key modules 315 including proper key information items 332 are connected to both of the ports 231a, 231b, and storage capacities of the EEPROMs 334 of both of the key modules 315a, 315b are the same, the information amount comparing unit 444 of the unauthorized usage prevention controller 529 compares the total information amounts of the plural key information items 332 stored in the EEPROMs 334 of the two key modules 315 (step S507). When the total information amount of the key information item 332 in the EEPROM 334 of the key module 315a is larger, the process proceeds to step S508, and when it is smaller (or when the amounts are equal, in the fifth embodiment), the process proceeds to step S509.

When the total information amount of the key information item 332 in the EEPROM 334 of the key module 315a is larger under the condition that the key modules 315a, 315b have the EEPROMs 334 of the same storage capacities, or when the EEPROM 334 of the key module 315a has a larger storage capacity, the copy direction specifying unit 445 of the unauthorized usage prevention controller 529 designates the key module 315a as the master key, and designates the other one, i.e., the key module 315b connected to the port 231b as the slave key (step S508). After these designations are made, the process proceeds to step S510.

When the total information amount of the key information item 332 in the EEPROM 334 of the key module 315b is larger under the condition that the key modules 315a, 315b have the EEPROMs 334 of the same storage capacities, or when the EEPROM 334 of the key module 315b has a larger storage capacity, the copy direction specifying unit 445 of the unauthorized usage prevention controller 529 designates the key module 315b as the master key, and designates the other one, i.e., the key module 315a as the slave key (step S509). After these designations are made, the process proceeds to step S510.

The key information copying unit 238 of the unauthorized usage prevention controller 529 copies the key information item 332 stored in the EEPROM 334 of the key module 315 designated as the slave key to the EEPROM 334 of the key module 315 designated as the master key (step S510). That is, the EEPROM 334 of the key module 315 designated as the master key is regarded as the key information storage unit. When the copying operation is completed, the process proceeds to step S511.

The copy allowability rewriting unit 343 of the unauthorized usage prevention controller 529 rewrites the copy permitting information 40 saved in the Data copy status area of the key information item 332 stored in the EEPROM 334 of the key module 315 designated as the slave key to the copy unpermitting information 41 (step S511). When the rewriting operation is completed, the process proceeds to step S512.

The execution permitting unit 239 of the unauthorized usage prevention controller 529 outputs, to the control unit 216 of the information processing unit 212, signals for permitting execution of all of the software items 28 corresponding to plural key information items 332 stored in the EEPROM 334 of the key module 315 designated as the master key (step S512). Then, the process of the flowchart shown in FIG. 15 ends.

As described above, in addition to the effects obtained by the unauthorized usage prevention system 410 according to the fourth embodiment, the unauthorized usage prevention system 510 according to the fifth embodiment is capable of collecting the key information items 332 into the EEPROM 334 that has a large storage capacity. Hence, the number of key information items 332 collected into the EEPROM 334 of the key module 315 can be increased. Accordingly, an increased number of software items 28 can be used only by having one key module 315 connected to the port 231a or the port 231b.

Sixth Embodiment

An unauthorized usage prevention system 610 according to a sixth embodiment of the present invention is described with reference to FIGS. 16 and 17. In the sixth embodiment, a user can easily know which key module 315 is designated as the master key among the key modules 315a and 315b connected to the ports 231a and 231b in the unauthorized usage prevention system 410 according to the fourth embodiment or the unauthorized usage prevention system 510 according to the fifth embodiment. Otherwise, the unauthorized usage prevention system 610 according to the sixth embodiment basically has the same configuration and operates in the same manner as the unauthorized usage prevention system 410 of the fourth embodiment or the unauthorized usage prevention system 510 according to the fifth embodiment, and therefore, common elements and common operations are not further described.

Figure 16:
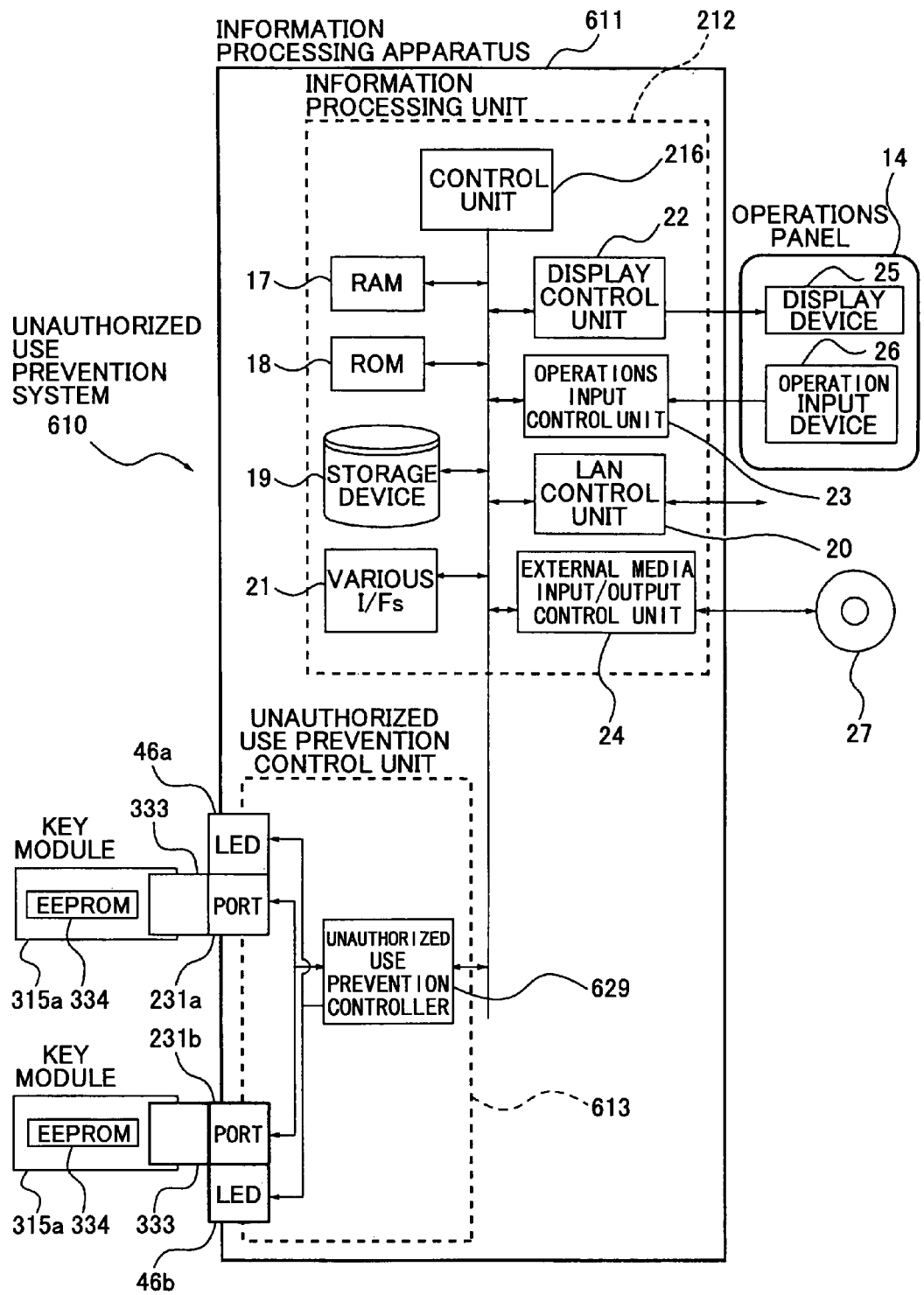
FIG. 16 is a block diagram of an information processing apparatus in which an unauthorized usage prevention system according to a sixth embodiment of the present invention is installed.
Figure 17:
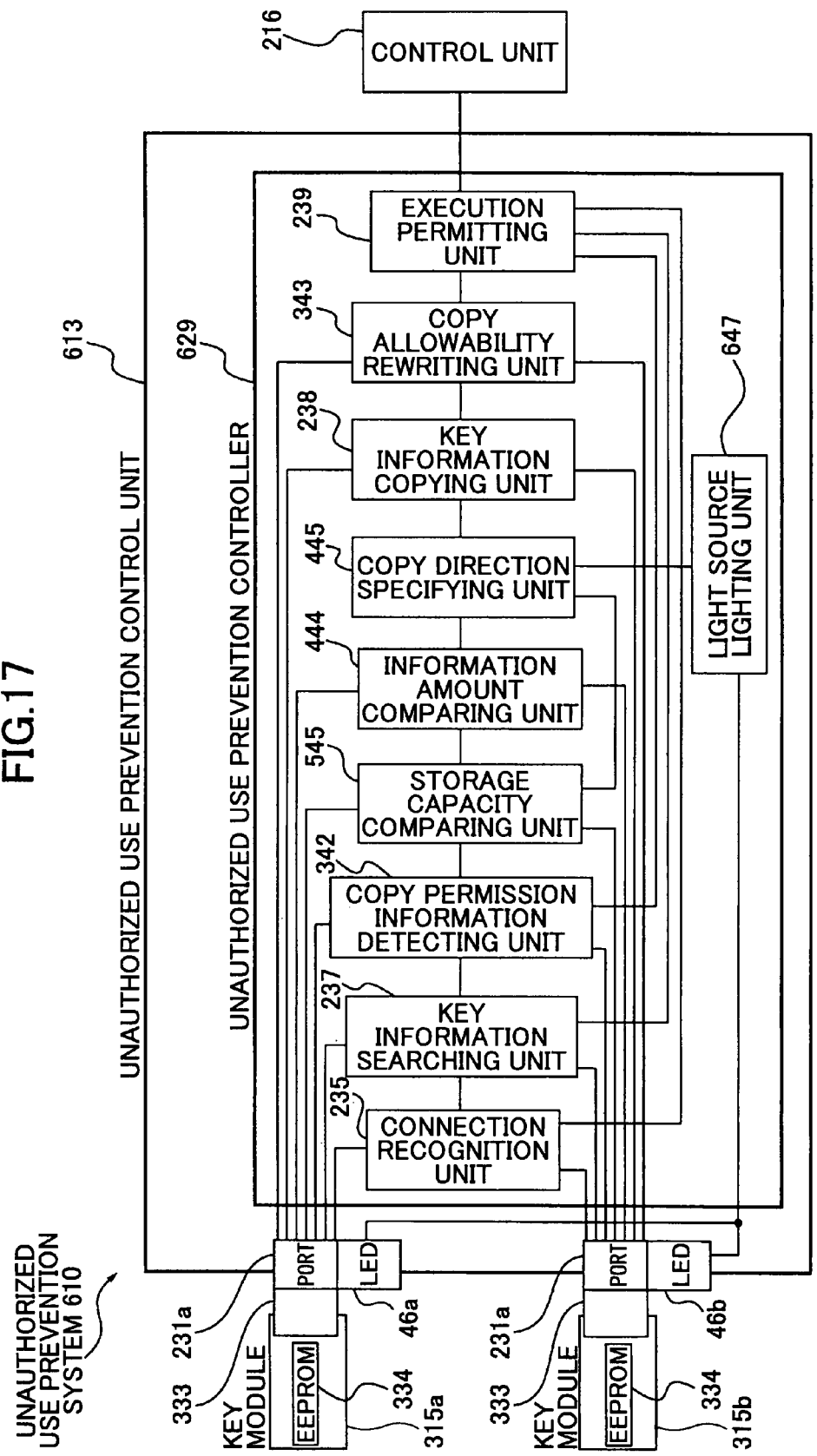
FIG. 17 is a block diagram for describing the structure and operations of an unauthorized usage prevention control unit in an information processing apparatus according to the sixth embodiment.

As shown in FIG. 16, an information processing apparatus 611 is provided with two light sources (46) corresponding to the two ports 231a, 231b. In the sixth embodiment, LEDs 46 are employed as the light sources (46); the light source corresponding to the port 231a is an LED 46a and the light source corresponding to the port 231b is an LED 46b. To control the lighting of the LEDs 46, an unauthorized use prevention controller 629 in an unauthorized usage prevention control unit 613 is provided with a light source lighting unit 647 (see FIG. 17). FIG. 17 illustrates an example where the LEDs 46a, 46b and the light source lighting unit 647 are added to the unauthorized usage prevention system 510 according to the fifth embodiment.

The light source lighting unit 647 is capable of separately lighting the LEDs 46a, 46b. In the sixth embodiment, as shown in FIG. 17, the light source lighting unit 647 can exchange information with the copy direction specifying unit 445. Among the LEDs 46 corresponding to the ports 231a, 231b, the light source lighting unit 647 lights the LED 46 corresponding to the port to which the key module 315 designated as the master key by the copy direction specifying unit 445 is connected. That is, if the key module 315a connected to the port 231a is designated as the master key, the light source lighting unit 647 lights the LED 46a. If the key module 315b connected to the port 231b is designated as the master key, the light source lighting unit 647 lights the LED 46b.

As described above, in addition to the effects obtained by the unauthorized usage prevention system 410 according to the fourth embodiment or the unauthorized usage prevention system 510 according to the fifth embodiment, with the unauthorized usage prevention system 610 according to the sixth embodiment, a user can easily know which key module 315 is designated as the master key among the key modules 315a and 315b connected to the ports 231a and 231b. Accordingly, it is possible to prevent the key module 315 designated as the master key from being removed from the port 231 and being lost.

According to one embodiment of the present invention, an unauthorized usage prevention system includes at least one software item including an identification information item uniquely associated with the software item; an information processing apparatus configured to perform execution of the software item in the event of receiving permission based on the identification information item, wherein the execution of the software item includes installation of the software item and operation of the software item; a key module including a storage storing a key information item uniquely associated with the identification information item of the software item; and a key information storage unit configured to hold the key information item of the key module, wherein the information processing apparatus includes a control unit configured to control the execution of the software item; an unauthorized usage prevention controller configured to prevent the execution controlled by the control unit; and a port to which the key module can be connected in such a manner that information can be exchanged between the unauthorized usage prevention controller and the key module, wherein the unauthorized usage prevention controller includes a connection recognition unit configured to recognize that the key module is connected to the port; and a key information copying unit configured to copy the key information item from the key module to the key information storage unit, wherein the key information copying unit copies the key information item from the key module to the key information storage unit in the event that the connection recognition unit recognizes that the key module is connected to the port; and the control unit of the information processing apparatus is configured to enable the execution of all of the software items with the identification information items associated with the key information items held in the key information storage unit.

In this configuration, in order to execute a software item, it is necessary to acquire a key information item corresponding to an identification number of the software item, which key information item is held in a storage of a key module. A control unit for controlling execution of the software item is configured to make software items executable if the software items have identification information items corresponding to key information items held in a key information storage unit. The key information storage unit holds plural key information items copied from the storage of the key module connected to a port. Therefore, even if plural software items are to be used, the software items can be executed without connecting, to the ports, the key modules including the key information items corresponding to the identification information items of the software items. Accordingly, the key modules can be used to appropriately restrict usage of plural software items, without having to increase the space for the key modules according to the number of connected key modules corresponding to the number of software products used at the same time.

Additionally, in the unauthorized usage prevention system, the key information storage unit includes a volatile memory provided in the information processing apparatus; the unauthorized usage prevention controller includes a key information searching unit configured to search the volatile memory to determine whether the volatile memory holds the key information item in the key module connected to the port; and in the event that the connection recognition unit recognizes that the key module is connected to the port and the key information searching unit determines that the volatile memory does not hold the key information item in the key module connected to the port, the key information copying unit copies the key information item in the key module connected to the port to the volatile memory.

In this configuration, the key information storage unit is a volatile memory provided in the information processing apparatus. Therefore, a software item can be executed from when the information processing apparatus starts up until when the information processing apparatus stops operating, if the software item has an identification information item corresponding to a key information item stored in the storage of a key module that has one been connected to the port. However, the key information item held in the volatile memory is erased as the information processing apparatus stops operating. Hence, when the information processing apparatus starts up once again, it is necessary to connect the key module once again. Accordingly, the key module can be used to appropriately restrict usage of a software item, without having to increase the space for the key modules according to the number of connected key modules corresponding to the number of software products used at the same time.

Additionally, in the unauthorized usage prevention system, the information processing apparatus includes two of the ports; the storage of the key module includes a writable nonvolatile memory; the unauthorized usage prevention controller includes a key information status detecting unit configured to detect, among the key modules connected to the ports, the number of the key modules storing the key information items in proper statuses in their nonvolatile memories, and the unauthorized usage prevention controller also includes an execution permitting unit configured to output, to the control unit of the information processing apparatus, a signal for permitting the execution of the software item associated with the key information item held in the key information storage unit; and in a situation where the connection recognition unit recognizes that the key module is connected to at least one of the two ports, when the key information status detecting unit detects that there are two key modules storing the key information items in proper statuses, the nonvolatile memory of a first one of the key modules connected to a first one of the ports is regarded as the key information storage unit, the key information copying unit copies the key information item held in the nonvolatile memory of a second one of the key modules connected to a second one of the ports to the nonvolatile memory of the first one of the key modules connected to the first one of the ports, and the execution permitting unit outputs, to the control unit of the information processing apparatus, the signal for permitting the execution of all of the software items associated with the key information items held in the nonvolatile memory of the first one of the key modules connected to the first one of the ports, when the key information status detecting unit detects that there is one key module storing the key information item in a proper status, the execution permitting unit outputs, to the control unit of the information processing apparatus, the signal for permitting the execution of the software item associated with the key information item held in the nonvolatile memory of the detected key module, when the key information status detecting unit detects that there are no key modules storing the key information item in a proper status, the execution permitting unit does not output, to the control unit of the information processing apparatus, any signals for permitting the execution of the software item, and the control unit enables the execution of only the software item associated with the signal for permitting the execution received from the execution permitting unit.

In this configuration, when key modules are connected to both of the two ports, and the key information items stored in the nonvolatile memories of both of the key modules are proper, the nonvolatile memory of a first one of the key modules is regarded as the key information storage unit. The key information item stored in the nonvolatile memory of a second one of the key modules is copied into the nonvolatile memory of the first key module. Thus, plural key information items can be stored in one key module, i.e., plural key information items can be collected into one key module. Accordingly, by connecting to the port, only the key module in which plural key information items are collected, it is possible to execute plural software items at the same time.

Additionally, in the unauthorized usage prevention system, the nonvolatile memory of the key module stores, in addition to the key information item, copy permission information for permitting the key information copying unit to copy the key information item held therein; the unauthorized usage prevention controller includes a copy permission information detecting unit configured to detect, among the key modules connected to the ports, the number of the key modules storing the copy permission information in their nonvolatile memories, and the unauthorized usage prevention controller also includes a copy allowability rewriting unit configured to rewrite the copy permission information in the nonvolatile memory of the key module into copy unpermission information; and in a situation where the key information status detecting unit detects that there are two key modules storing the key information items in proper statuses, when the copy permission information detecting unit detects that there are two key modules storing the copy permission information, the nonvolatile memory of a first one of the key modules connected to a first one of the ports is regarded as the key information storage unit, the key information copying unit copies the key information item held in the nonvolatile memory of a second one of the key modules connected to a second one of the ports to the nonvolatile memory of the first one of the key modules connected to the first one of the ports, the copy allowability rewriting unit rewrites the copy permission information in the nonvolatile memory of the second one of the key modules connected to the second one of the ports into the copy unpermission information, and the execution permitting unit outputs, to the control unit of the information processing apparatus, the signal for permitting the execution of all of the software items associated with the key information items held in the nonvolatile memory of the first one of the key modules connected to the first one of the ports, when the copy permission information detecting unit detects that there is one key module storing the copy permission information, the execution permitting unit outputs, to the control unit of the information processing apparatus, the signal for permitting the execution of the software item associated with the key information item held in the nonvolatile memory of the detected key module, when the copy permission information detecting unit detects that there are no key modules storing the copy permission information, the execution permitting unit does not output, to the control unit of the information processing apparatus, any signals for permitting the execution of the software item; in a situation where the key information status detecting unit detects that there is one key module storing the key information item in a proper status, when the copy permission information detecting unit detects that there is one key module storing the copy permission information, the execution permitting unit outputs, to the control unit of the information processing apparatus, the signal for permitting the execution of the software item associated with the key information item held in the nonvolatile memory of the detected key module, and when the copy permission information detecting unit detects that there are no key modules storing the copy permission information, the execution permitting unit does not output, to the control unit of the information processing apparatus, any signals for permitting the execution of the software item; and the key information copying unit does not copy the key information item from the nonvolatile memory of the key module storing the copy unpermission information.

In this configuration, when a key information item stored in a nonvolatile memory of a second key module is copied into a nonvolatile memory of a first key module, copy unpermitting information is stored in the nonvolatile memory of the second key module. Accordingly, it is possible to prevent a key information item stored in a nonvolatile memory of a key module that has been used as a copy source in the past, from being used as a copy source once again. Thus, it is possible to prevent the key information copying unit of the information processing apparatus from making a practical duplicate copy of a key information item stored in a nonvolatile memory of a key module.

Additionally, in the unauthorized usage prevention system, the unauthorized usage prevention controller includes an information amount comparing unit configured to compare total information amounts of the key information items held in the nonvolatile memories of the key modules connected to the ports; and a copy direction specifying unit configured to designate one of the key modules connected to one of the ports as a master key into which the key information item is written by the key information copying unit and to designate the other one of the key modules connected to the other one of the ports as a slave key from which the key information item is read by the key information copying unit, wherein among the key modules connected to the ports, the copy direction specifying unit designates, as the master key, the key module determined by the information amount comparing unit as storing the key information item of a larger total information amount, and the copy direction specifying unit designates the other key module as the slave key, wherein the nonvolatile memory of the master key is regarded as the key information storage unit; and the key information copying unit copies the key information item in the nonvolatile memory of the key module designated as the slave key into the nonvolatile memory of the key module designated as the master key.

In this configuration, among the key modules connected to both ports, the key module determined as having a larger total information amount in the key information item stored in its nonvolatile memory is designated as the master key. Accordingly, it is possible to efficiently exchange information, i.e., copy key information items, between the nonvolatile memories of the two key modules connected to both of the ports.

Additionally, in the unauthorized usage prevention system, the unauthorized usage prevention controller includes an information amount comparing unit configured to compare total information amounts of the key information items held in the nonvolatile memories of the key modules connected to the ports; a storage capacity comparing unit configured to compare storage capacities of the nonvolatile memories of the key modules connected to the ports; and a copy direction specifying unit configured to designate one of the key modules connected to one of the ports as a master key into which the key information item is written by the key information copying unit and to designate the other one of the key modules connected to the other one of the ports as a slave key from which the key information item is read by the key information copying unit, wherein among the key modules connected to the ports, the copy direction specifying unit designates, as the master key, the key module determined by the storage capacity comparing unit as having the nonvolatile memory of a larger storage capacity, and the copy direction specifying unit designates the other key module as the slave key, wherein the nonvolatile memory of the master key is regarded as the key information storage unit; when the storage capacity comparing unit determines that the nonvolatile memories of the key modules connected to the ports have substantially the same storage capacities, among the key modules connected to the ports, the copy direction specifying unit designates as the master key the key module determined by the information amount comparing unit as storing the key information item of a larger total information amount, and the copy direction specifying unit designates the other key module as the slave key, wherein the nonvolatile memory of the master key is regarded as the key information storage unit; and the key information copying unit copies the key information item in the nonvolatile memory of the key module designated as the slave key into the nonvolatile memory of the key module designated as the master key.

In this configuration, among the key modules connected to both ports, the key module determined as having a nonvolatile memory of a larger storage capacity is designated as the master key. Plural key information items are collected into the nonvolatile memory of a larger storage capacity, and therefore, the master key can store more key information items.

Additionally, in the unauthorized usage prevention system, the information processing apparatus includes light sources each corresponding to one of the ports; and the unauthorized usage prevention controller includes a light source lighting unit configured to light one of the light sources corresponding to the port to which the key module designated as the master key is connected.

In this configuration, it is easy to know which one of the key modules is designated as a master key, based on the lighting status of the light sources corresponding to the ports.

The present invention is not limited to the specifically disclosed embodiment, and variations and modifications may be made without departing from the scope of the present invention.

The present application is based on Japanese Priority Patent Application No. 2006-246042, filed on Sep. 11, 2006, the entire contents of which are hereby incorporated by reference.

What is claimed is:

1. An unauthorized usage prevention system comprising:
   at least one software item including an identification information item uniquely associated with the software item;
   at least one key module including a writable nonvolatile memory storing a key information item uniquely associated with the identification information item of the software item; and
   an information processing apparatus including,
      a central processing unit (CPU) to control execution of the software item and to perform the execution of the software item in an event of receiving permission based on the identification information item, the CPU enabling the execution of only the software item associated with the signal for permitting the execution received from an unauthorized use prevention control unit,
      the unauthorized use prevention control unit including a volatile memory that holds the key information item of the at least one key module and prevents the execution controlled by the CPU, and two ports, a one of the two ports to which the at least one key module is connected enables information to be exchanged between the unauthorized use prevention control unit and the at least one key module, recognizing that the at least one key module is connected to a one of the two ports, searching the volatile memory to determine whether the volatile memory holds the key information item in the at least one key module connected to the one of the two ports, and copying the key information item from the at least one key module to the volatile memory in the event that the at least one key module is connected to the one of the two ports,
         in an event that the at least one key module is connected to one of the two ports and the volatile memory does not hold the key information item in a key module connected to the one of the two ports, copy the key information item in the key module connected to the one of the two ports to the volatile memory,
         when there is more than one key module, detect, among the key modules connected to the ports, the number of key modules storing the key information items in proper statuses in the nonvolatile memory of each of the key modules,
         output to the CPU a signal for permitting the execution of the software item associated with the key information item held in the volatile memory,
         in an event that the key module is connected to at least one of the ports, and there are two key modules storing the key information items in proper statuses, the nonvolatile memory of a first one of the key modules connected to a first one of the ports is regarded as a key information storage unit, copy the key information item held in the nonvolatile memory of a second one of the key modules connected to a second one of the ports to the nonvolatile memory of the first one of the key modules connected to the first one of the two ports, and outputs, to the CPU, the signal for permitting the execution of all the software items associated with the key information items held in the nonvolatile memory of the first one of the key modules connected to the first one of the two ports,
      when there is one key module storing the key information item in a proper status, output, to the CPU, the signal for permitting the execution of the software item associated with the key information item held in the nonvolatile memory of the one key module,
      when there are no key modules storing the key information item in a proper status, the unauthorized use prevention control unit does not output, to the CPU, any signals for permitting the execution of the software item.

2. The unauthorized usage prevention system according to claim 1, wherein,
   the nonvolatile memory of the at least one key module stores, in addition to the key information item, copy permission information for permitting the unauthorized use prevention control unit to copy the key information item held therein;
   the unauthorized use prevention control unit, including the volatile memory, detects, among the at least one key module connected to the one of the two ports, the number of the at least one key modules storing the copy permission information in the nonvolatile memory of the at least one key module, and rewrites the copy permission information in the nonvolatile memory of the at least one key module into a copy unpermission information; and
   in a situation where the unauthorized use prevention control unit, including the volatile memory, detects that there are two key modules storing the key information items in proper statuses,
   when there are two key modules storing the copy permission information, the nonvolatile memory of a first one of the key modules connected to a first one of the ports is regarded as a key information storage unit, the unauthorized use prevention control unit, including the volatile memory, copies the key information item held in the nonvolatile memory of a second one of the key modules connected to a second one of the ports to the nonvolatile memory of the first one of the key modules connected to the first one of the ports, rewrites the copy permission information in the nonvolatile memory of the second one of the key modules connected to the second one of the ports into the copy unpermission information, and outputs, to the CPU of the information processing apparatus, the signal for permitting the execution of all of the software items associated with the key information items held in the nonvolatile memory of the first one of the key modules connected to the first one of the ports,
   when there is one key module storing the copy permission information, the unauthorized use prevention control unit, including the volatile memory, outputs, to the CPU, the signal for permitting the execution of the software item associated with the key information item held in the nonvolatile memory of the detected key module, when there are no key modules storing the copy permission information, the unauthorized use prevention control unit, including the volatile memory, does not output, to the CPU, any signals for permitting the execution of the software item;

in a situation where the unauthorized use prevention control unit, including the volatile memory, detects that there is one key module storing the key information item in a proper status, when there is one key module storing the copy permission information, the unauthorized use prevention control unit, including the volatile memory, outputs, to the CPU, the signal for permitting the execution of the software item associated with the key information item held in the nonvolatile memory of the detected key module, and when there are no key modules storing the copy permission information, the unauthorized use prevention control unit, including the volatile memory, does not output, to the CPU, any signals for permitting the execution of the software item; and the unauthorized use prevention control unit, including the volatile memory, does not copy the key information item from the nonvolatile memory of the key module storing the copy unpermission information.

3. The unauthorized usage prevention system according to claim 2, wherein the unauthorized use prevention control unit, including the volatile memory, compares total information amounts of the key information items held in the nonvolatile memory of each of the key modules connected to the ports; and designates one of the key modules connected to one of the ports as a master key into which the key information item is written and designates the other one of the key modules connected to the other one of the ports as a slave key from which the key information item is read, wherein, among the key modules connected to the ports, the unauthorized use prevention control unit, including the volatile memory, designates, as the master key, the key module determined as storing the key information item of a larger total information amount, and designates the other key module as the slave key, wherein the nonvolatile memory of the master key is regarded as a key information storage unit; and the unauthorized use prevention control unit, including the volatile memory, copies the key information item in the nonvolatile memory of the key module designated as the slave key into the nonvolatile memory of the key module designated as the master key.

4. The unauthorized usage prevention system according to claim 2, wherein the unauthorized use prevention control unit, including the volatile memory, compares total information amounts of the key information items held in the nonvolatile memory of each of the key modules connected to the ports;

compares storage capacities of the nonvolatile memories of the key modules connected to the ports; and designates one of the key modules connected to one of the ports as a master key into which the key information item is written designates the other one of the key modules connected to the other one of the ports as a slave key from which the key information item is read, wherein, among the key modules connected to the ports, the unauthorized use prevention control unit, including the volatile memory, designates, as the master key, the key module determined as having the nonvolatile memory of a larger storage capacity, and designates the other key module as the slave key, wherein the nonvolatile memory of the master key is regarded as a key information storage unit;

when the unauthorized use prevention control unit, including the volatile memory, determines that the nonvolatile memories of the key modules connected to the ports have the same storage capacities, among the key modules connected to the ports, the unauthorized use prevention control unit, including the volatile memory, designates as the master key the key module determined as storing the key information item of a larger total information amount, and designates the other key module as the slave key, wherein the nonvolatile memory of the master key is regarded as the key information storage unit; and the unauthorized use prevention control unit, including the volatile memory, copies the key information item in the nonvolatile memory of the key module designated as the slave key into the nonvolatile memory of the key module designated as the master key.

5. The unauthorized usage prevention system according to claim 3, wherein:

the information processing apparatus, including the CPU, includes light emitting diode (LED) light sources each corresponding to one of the ports; and the unauthorized use prevention control unit, including the volatile memory, lights one of the LED light sources corresponding to the port to which the key module designated as the master key is connected.

6. The unauthorized usage prevention system according to claim 4, the information processing apparatus, including the CPU, includes light emitting diode (LED) light sources each corresponding to one of the ports; and the unauthorized use prevention control unit, including the volatile memory, lights one of the light sources corresponding to the port to which the key module designated as the master key is connected.

7. An information processing apparatus including a volatile memory and two ports for performing execution of a software item in the event of receiving permission based on an identification information item uniquely associated with the software item, wherein the execution of the software item includes installation of the software item and operation of the software item, the information processing apparatus comprising:

a central processing unit (CPU) to control the execution of the software item;

an unauthorized use prevention control unit including a volatile memory that holds the key information item of at least one key module and prevents the execution controlled by the CPU, and two ports, a one of the two ports to which the at least one key module is connected enables information to be exchanged between the unauthorized use prevention control unit and the at least one key module, recognizing that the at least one key module is connected to the one of the two ports, searching the volatile memory to determine whether the volatile memory holds the key information item in the at least one key module connected to the one of the two ports, and copying the key information item from the at least one key module to the volatile memory in the event that the at least one key module is connected to the one of the two ports; and in an event that the at least one key module is connected to one of the two ports and the volatile memory does not hold the key information item in a key module connected to the one of the two ports, copy the key information item in the key module connected to the one of the two ports to the volatile memory, in an event that the key module is connected to at least one of the ports, and there are two key modules storing the key information items in proper statuses, the nonvolatile memory of a first one of the key modules connected to a first one of the ports is regarded as a key information storage unit, copy the key information item held in the nonvolatile memory of a second one of the key modules connected to a second one of the ports to the nonvolatile memory of the first one of the key modules connected to the first one of the two ports, and outputs, to the CPU, the signal for permitting the execution of all software items associated with the key information items held in the nonvolatile memory of the first one of the key modules connected to the first one of the two ports, when there is one key module storing the key information item in a proper status, output, to the CPU, the signal for permitting the execution of the software item associated with the key information item held in the nonvolatile memory of the one key module, when there are no key modules storing the key information item in a proper status, the unauthorized use prevention control unit does not output, to the CPU, any signals for permitting the execution of the software item, and the CPU enables the execution of only the software item associated with the signal for permitting the execution received from the unauthorized use prevention control unit.

\* \* \* \* \*